United States Patent
Brandt et al.

(10) Patent No.: US 12,325,938 B2
(45) Date of Patent: Jun. 10, 2025

(54) NONWOVEN ENTANGLEMENT SYSTEM AND METHODS OF MANUFACTURE

(71) Applicant: NIKE, Inc., Beaverton, OR (US)

(72) Inventors: Baron C. Brandt, Portland, OR (US); Dallas Lund, Portland, OR (US); Andrea J. Staub, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 428 days.

(21) Appl. No.: 17/742,906

(22) Filed: May 12, 2022

(65) Prior Publication Data

US 2022/0380953 A1 Dec. 1, 2022

Related U.S. Application Data

(60) Provisional application No. 63/194,556, filed on May 28, 2021.

(51) Int. Cl.
*D04H 1/498* (2012.01)
*D04H 1/49* (2012.01)
(Continued)

(52) U.S. Cl.
CPC ............ *D04H 1/49* (2013.01); *D04H 1/498* (2013.01); *D04H 18/02* (2013.01); *D04H 18/04* (2013.01);
(Continued)

(58) Field of Classification Search
CPC ........ D04H 18/02; D04H 18/00; D04H 18/04; D04H 1/46; D04H 3/102; D04H 3/105;
(Continued)

(56) References Cited

U.S. PATENT DOCUMENTS

| 1,220,663 A | * | 3/1917 | Maussner | D04H 18/02 |
| | | | | 28/108 |
| 2,372,484 A | * | 3/1945 | Gould | D04H 18/02 |
| | | | | 28/114 |

(Continued)

FOREIGN PATENT DOCUMENTS

| CN | 108166153 A | * | 6/2018 | ........... A61K 8/0212 |
| JP | 61-225361 A | | 10/1986 | |

(Continued)

OTHER PUBLICATIONS

Housman, Justin, "Is This Jacket the Future of Down?", Adventure-Journal.com, Aug. 29, 2017, 10 pages.

(Continued)

*Primary Examiner* — Amy Vanatta
(74) *Attorney, Agent, or Firm* — SHOOK, HARDY & BACON L.L.P.

(57) ABSTRACT

Aspects herein are directed to a composite nonwoven textile that includes non-linear entangled seams and method and systems for producing the same. The composite nonwoven textile includes at least a first nonwoven layer, a second layer, and a fill material positioned between the first nonwoven layer and the second layer. When the composite nonwoven textile is formed into a garment, the regions between the non-linear entangled seams may help store and retain heat to provide insulation, and the non-linear entangled seams may help prevent shifting or drift of the fill material.

11 Claims, 13 Drawing Sheets

(51) Int. Cl.
  *D04H 18/02* (2012.01)
  *D04H 18/04* (2012.01)
(52) U.S. Cl.
  CPC .... *D10B 2403/023* (2013.01); *D10B 2501/00* (2013.01)
(58) Field of Classification Search
  CPC ........ D04H 13/005; D04H 1/498; D04H 5/02; D04H 1/465; D04H 1/49; D04H 1/492; D04H 1/495; D04H 13/003; D04H 5/03; D04H 3/11; B32B 2250/20; B32B 3/30; B32B 5/02; B32B 5/022; B32B 2250/03; B32B 5/06; B32B 5/265
  USPC .................... 28/107, 110, 111, 114
  See application file for complete search history.

(56) References Cited

U.S. PATENT DOCUMENTS

| | | | |
|---|---|---|---|
| 3,493,462 A * | 2/1970 | Wallar, Jr. | D04H 1/492 162/204 |
| 3,731,648 A * | 5/1973 | Gerber | B26D 7/27 118/506 |
| 4,232,620 A | 11/1980 | Kurz | |
| 4,481,247 A | 11/1984 | Tesch et al. | |
| 4,532,173 A * | 7/1985 | Suzuki | B32B 5/06 428/218 |
| 4,536,927 A * | 8/1985 | Feyerl | D04H 18/02 28/115 |
| 4,621,662 A * | 11/1986 | Olry | D04H 18/02 156/425 |
| 4,637,947 A | 1/1987 | Maekawa et al. | |
| 4,646,366 A | 3/1987 | Nishida et al. | |
| 4,777,706 A * | 10/1988 | Stanislaw | D04H 18/02 28/142 |
| 4,878,278 A * | 11/1989 | Hsu | D21F 7/08 28/142 |
| 4,977,653 A * | 12/1990 | Pum | D04H 18/02 28/115 |
| 5,511,294 A * | 4/1996 | Fehrer | D04H 18/02 28/107 |
| 5,543,005 A * | 8/1996 | Monget | D04H 3/10 156/169 |
| 5,551,134 A * | 9/1996 | Fehrer | D04H 18/02 28/115 |
| 5,737,813 A * | 4/1998 | Sternlieb | D06B 11/0093 28/163 |
| 5,914,002 A * | 6/1999 | Cahuzac | D04H 3/002 156/92 |
| 5,987,669 A | 11/1999 | Leggett et al. | |
| 6,568,049 B1 * | 5/2003 | Putnam | D04H 1/498 28/104 |
| 9,428,852 B2 * | 8/2016 | Gautier | D04H 1/498 |
| 9,573,340 B2 | 2/2017 | Riccelli | |
| 10,112,364 B2 | 10/2018 | Orologio | |
| 10,271,599 B2 | 4/2019 | Park et al. | |
| 10,442,155 B2 | 10/2019 | Dorton | |
| 2002/0078538 A1 * | 6/2002 | Ngai | D04H 1/495 28/104 |
| 2002/0104576 A1 | 8/2002 | Howland | |
| 2005/0011060 A1 * | 1/2005 | Fuchs | D04H 18/02 28/107 |
| 2007/0062638 A1 | 3/2007 | Carroll | |
| 2009/0155543 A1 | 6/2009 | Fowler | |
| 2014/0310848 A1 | 10/2014 | Ulriksen et al. | |
| 2015/0135435 A1 | 5/2015 | Ueda et al. | |
| 2017/0000203 A1 | 1/2017 | Jung et al. | |
| 2017/0254005 A1 | 9/2017 | Gladish et al. | |
| 2019/0269188 A1 | 9/2019 | Ridley et al. | |
| 2019/0330773 A1 | 10/2019 | Hanson et al. | |
| 2020/0155374 A1 * | 5/2020 | Makihara | A61F 13/511 |
| 2020/0221826 A1 | 7/2020 | Dua et al. | |

FOREIGN PATENT DOCUMENTS

| | | |
|---|---|---|
| JP | 63-069119 U | 5/1988 |
| JP | 11-172566 A | 6/1999 |
| JP | 2002-371457 A | 12/2002 |
| TW | 253118 B | 8/1995 |
| TW | 554099 B | 9/2003 |
| WO | 91/14035 A1 | 9/1991 |
| WO | 01/96101 A1 | 12/2001 |
| WO | 2017/062281 A1 | 4/2017 |
| WO | 2018/067676 A1 | 4/2018 |
| WO | 2019/150029 A1 | 8/2019 |

OTHER PUBLICATIONS

International Preliminary Report on Patentability received for PCT Patent Application No. PCT/US22/029156, mailed on Dec. 7, 2023, 8 pages.
International Search Report and Written Opinion dated Sep. 5, 2022 in International Patent Application No. PCT/US2022/029156, 10 pages.
Office Action received for European Patent Application No. 22727689.6, mailed on Jan. 9, 2024, 3 pages.
Holofiber or Synthetic Winterizer: Which Material is Warmer. The Difference Between Holofiber and Synthetic Winterizer, Berkserkheores—Bathroom renovation portal, Useful Tips, Available online at <https://berserkheroes.ru/en/mebel-i-aksessuary-dlya-vannojj/hollofaiber-ili-sintepon-kakoi-material-teplee-raznica-mezhdu-holofaiberom/>, 2022, pp. 1-27.
Is This Jacket the Future of Down?, Adventure-Journal.com.
Anusha et al., "Research on Thermal Insulation Characteristic of Multilayer Clothing", International Journal of Innovative Technology and Exploring Engineering (IJITEE), vol. 8, Issue—12S, Available online at <https://www.jitee.org/wp-content/uploads/papers/v8i12S/L114010812S19.pdf>, Oct. 2019, pp. 564-570.
International Search Report and Written Opinion received for PCT Patent Application No. PCT/US2022/029156, mailed on Sep. 5, 2022, 11 pages.
Office Action received for European Application No. 22727689.6, mailed on Aug. 28, 2024, 5 pages.

* cited by examiner

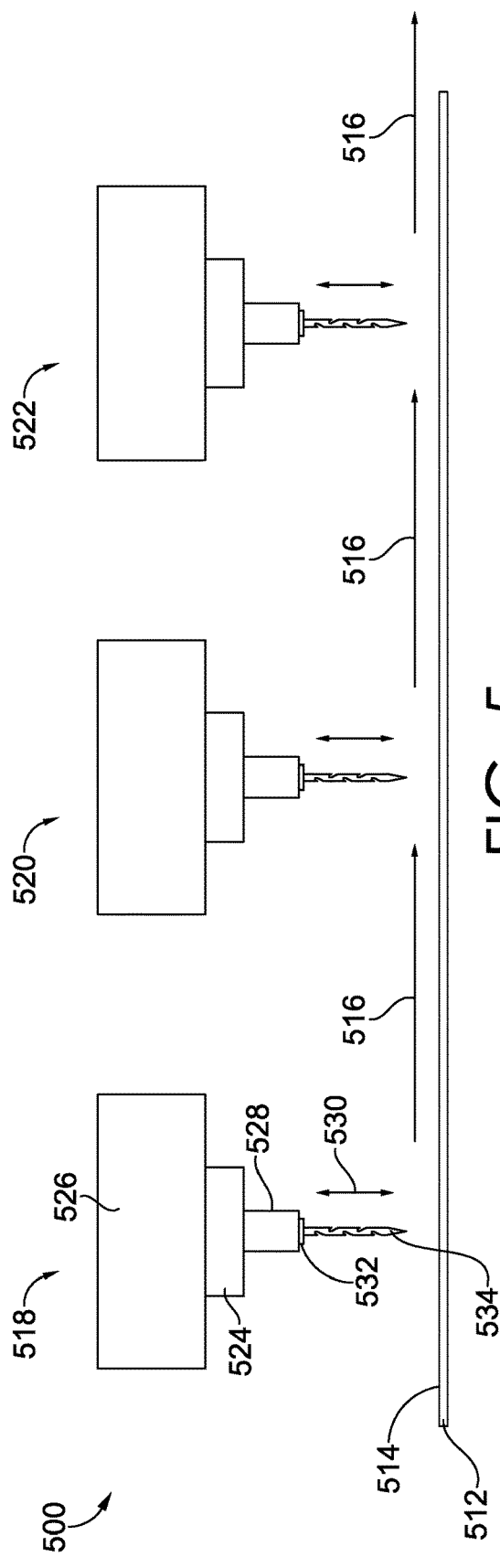
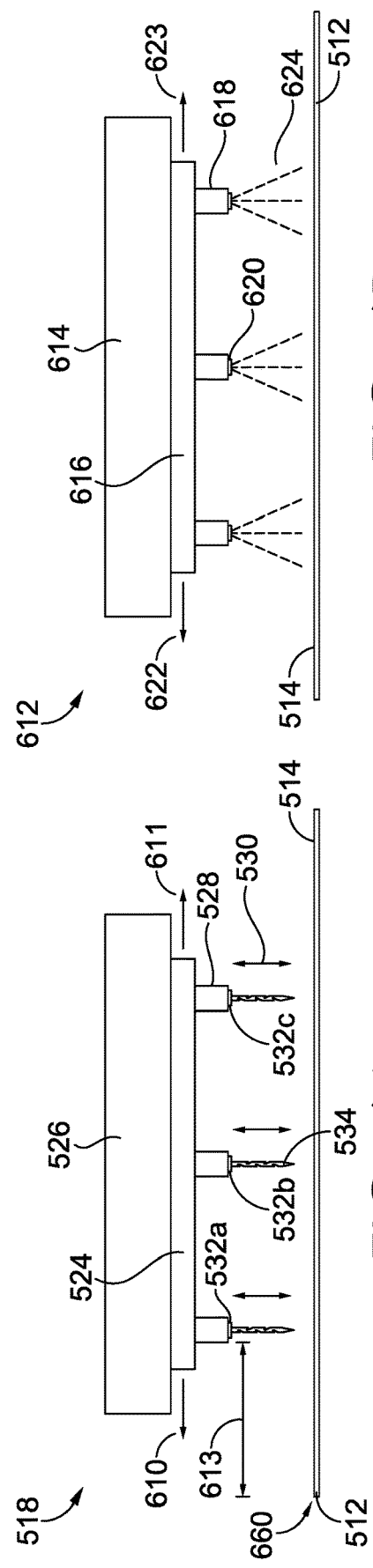
FIG. 5
FIG. 6A
FIG. 6B

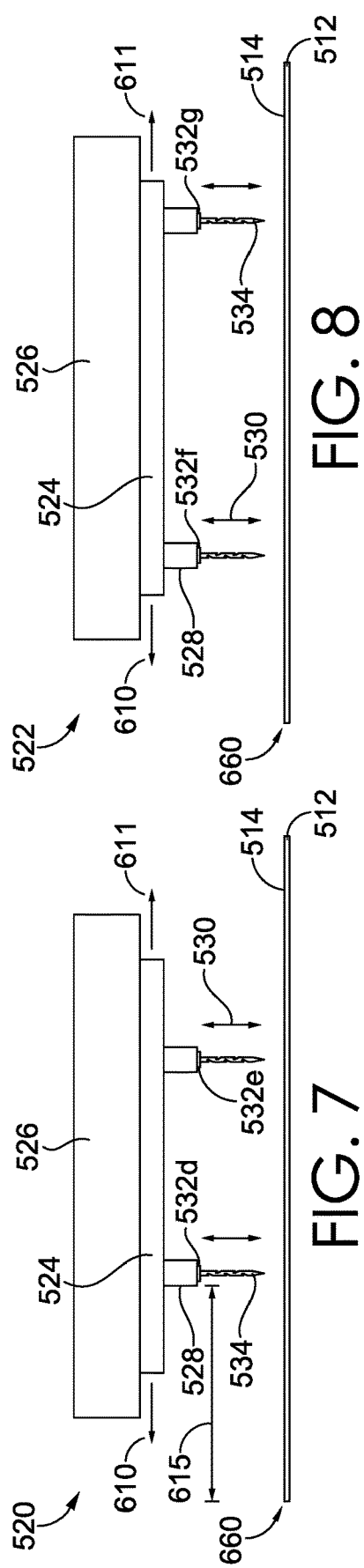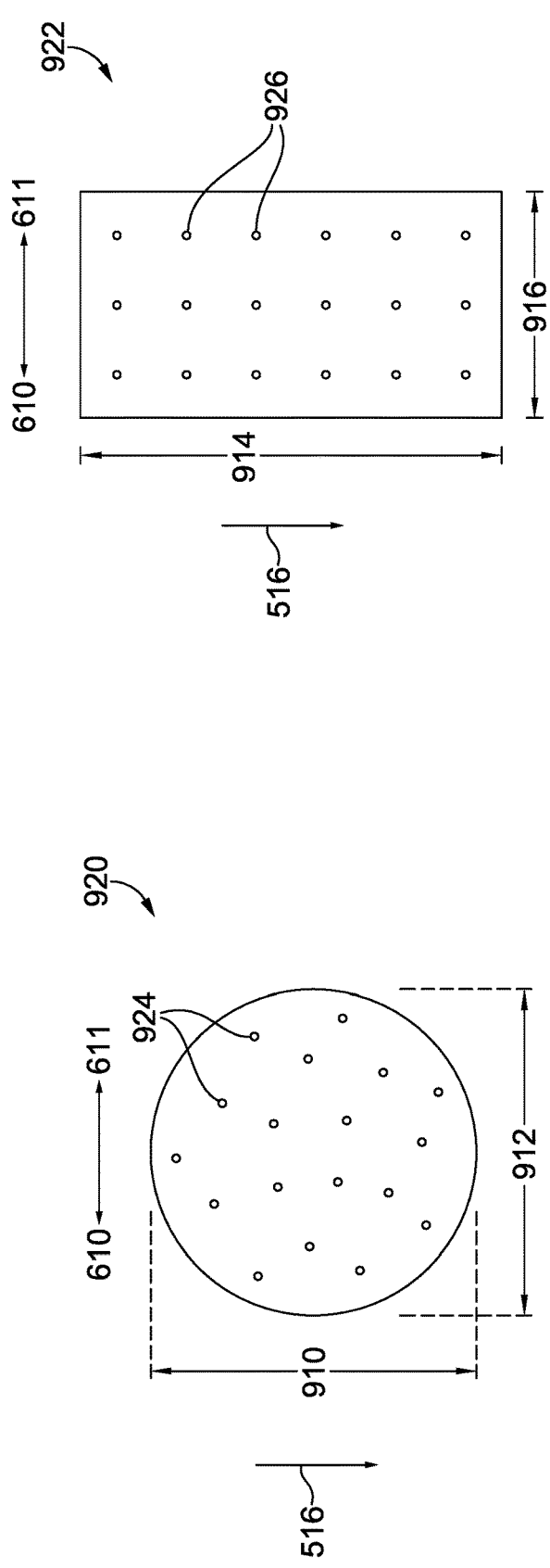

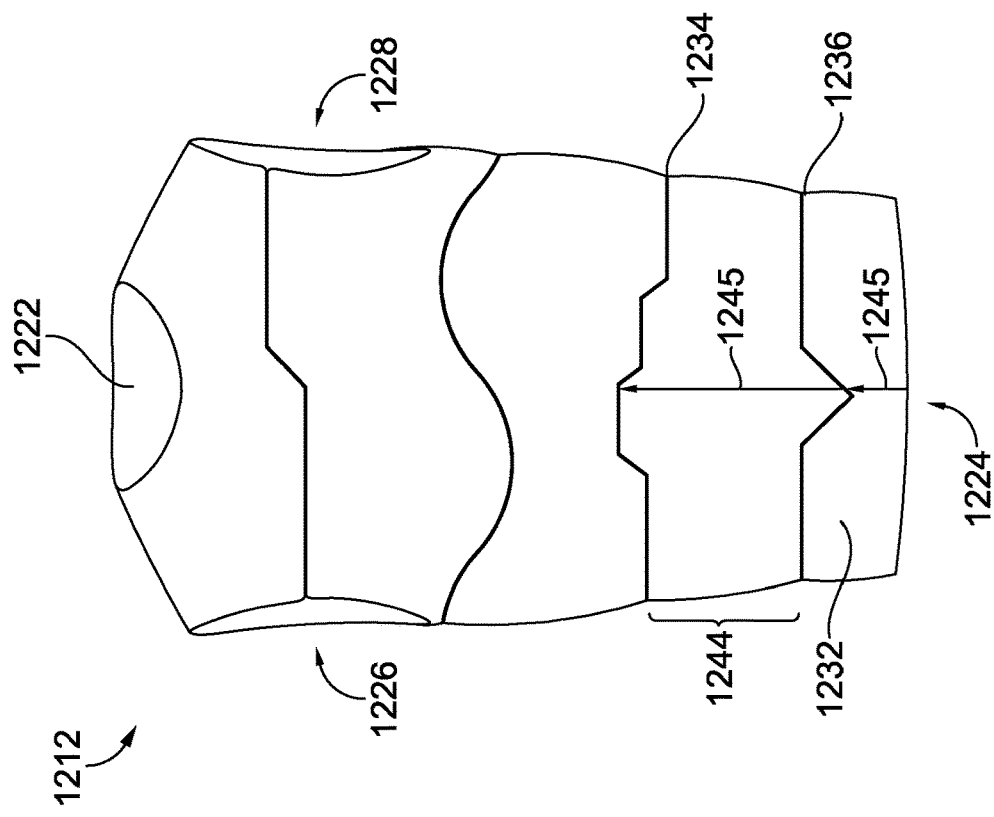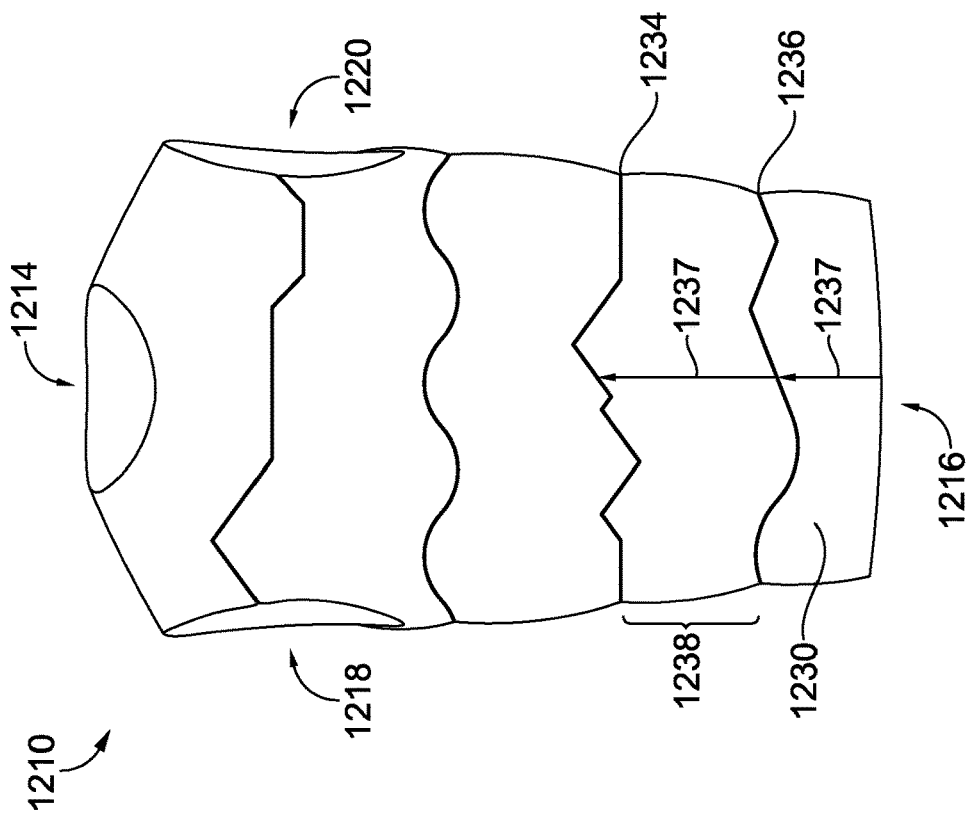
FIG. 12

NONWOVEN ENTANGLEMENT SYSTEM AND METHODS OF MANUFACTURE

This application titled "Nonwoven Entanglement System and Methods of Manufacture," claims the benefit of priority of U.S. App. No. 63/194,556, filed May 28, 2021, and titled "Composite Nonwoven Textile with Non-Linear Entangled Seams Suitable for Garments," the entirety of which is incorporated by reference herein.

TECHNICAL FIELD

Aspects herein are directed to a nonwoven textile with non-linear entangled seams suitable for garments and methods and systems for producing the same.

BACKGROUND

Traditional insulating garments are generally formed by positioning panels of textile materials (e.g., woven or knit textiles) adjacent to each other, optionally applying an adhesive to the panels of textile materials at predetermined locations, heat pressing and/or stitching the textile materials together at the predetermined locations to form linear seams that separate baffles, and filling the baffles with down or other types of thermally insulating fill materials. This construction method may be expensive due to the number of different materials used to form the garment and may also be time intensive. Moreover, the energy costs and carbon footprint associated with, for example, spinning the yarns used in the textile materials, weaving or knitting the textile materials using the yarns, applying the adhesive, heat pressing or stitching the seams, and filling the baffles may be high and the recyclability of the resulting garment may be limited due to the presence of a large number of disparate materials. When the textile materials used to form the garment include some type of repeating visual arrangement of elements (e.g., a visual arrangement of printed components, a visual arrangement of seams, and the like), there may be material waste to ensure that each garment in a garment lot includes the visual arrangement of elements at a consistent location on the garment in order to present a uniform appearance for each garment in the garment lot.

BRIEF DESCRIPTION OF THE FIGURES

Examples of aspects herein are described in detail below with reference to the attached drawing figures, wherein:

FIG. 5 illustrates a side view of an example entanglement system for producing the composite nonwoven textile of FIG. 1 in accordance with aspects herein;

FIG. 6A illustrates a front view of a first example entanglement station that is part of the entanglement system of FIG. 5 in accordance with aspects herein;

FIG. 6B illustrates a front view of an alternative example entanglement station that is part of the entanglement system of FIG. 5 in accordance with aspects herein;

FIG. 7-8 illustrate front views of additional example entanglement stations that are part of the entanglement system of FIG. 5 in accordance with aspects herein;

FIGS. 9A and 9B illustrate example entanglement heads for use in the entanglement system of FIG. 5 in accordance with aspects herein;

FIG. 12 illustrates an array of upper-body garments formed using the example process of FIG. 11 in accordance with aspects herein;

DETAILED DESCRIPTION

Figure 1:
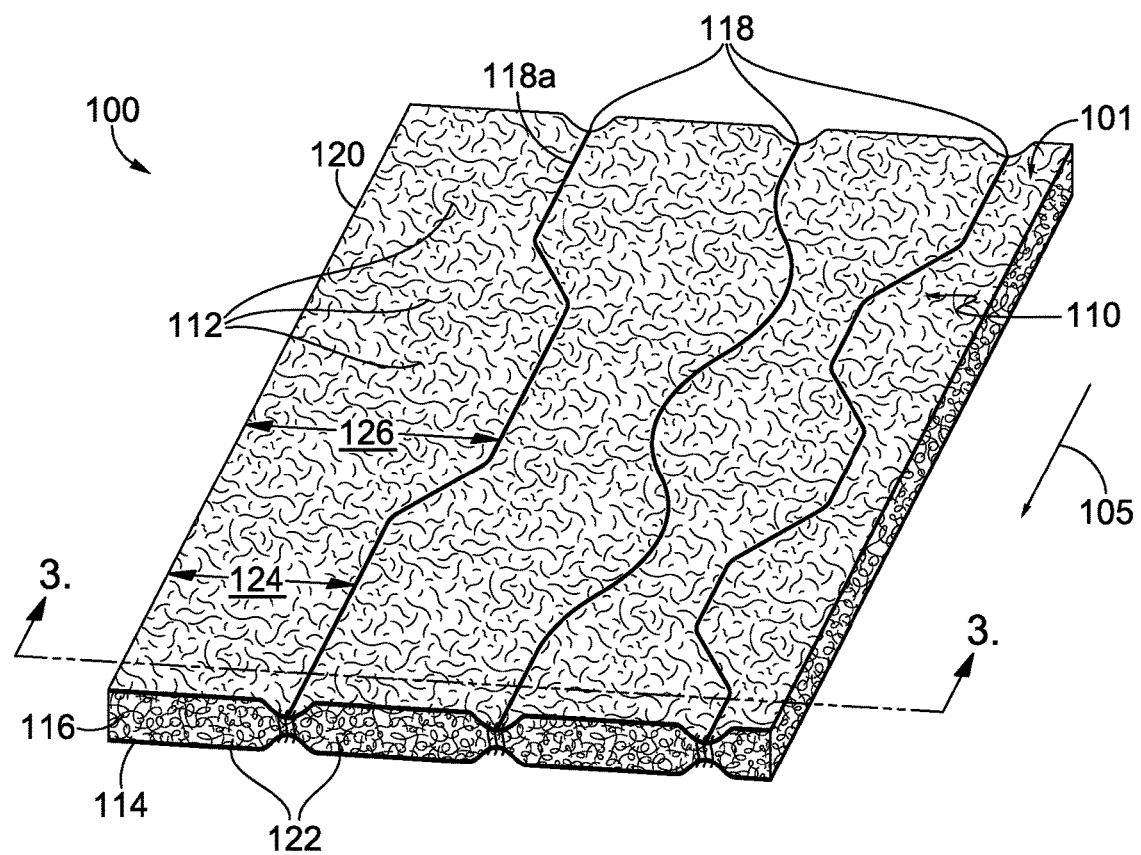
FIG. 1 illustrates a first surface of an example composite nonwoven textile having non-linear entangled seams in accordance with aspects herein.

The subject matter of the present invention is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

Traditional insulating garments are generally formed by positioning panels of textile materials (e.g., woven or knit textiles) adjacent to each other, optionally applying an adhesive to the panels of textile materials at predetermined locations, heat pressing and/or stitching the textile materials together at the predetermined locations to form linear seams that separate baffles, and filling the baffles with down or other types of thermally insulating fill materials. This construction method may be expensive due to the number of different materials used to form the garment and may also be time intensive. Moreover, the energy costs and carbon footprint associated with, for example, spinning the yarns used in the textile materials, weaving or knitting the textile materials using the yarns, applying the adhesive, heat pressing or stitching the seams, and filling the baffles may be high and the recyclability of the resulting garment may be limited due to the presence of a large number of disparate materials. When the textile materials used to form the garment include some type of repeating visual arrangement of elements (e.g., a visual arrangement of printed components, a visual arrangement of seams, and the like), there may be material waste to ensure that each garment in a garment lot includes the visual arrangement of elements at a consistent location on the garment in order to present a uniform appearance for each garment in the garment lot.

At a high level, aspects herein are directed to a composite nonwoven textile having non-linear entangled seams suitable for garments and methods and systems for producing the same. In example aspects, an entanglement system may be used to form the composite nonwoven textile. The entanglement system, in example aspects, may include one or more entanglement stations that may be aligned serially along a conveyance system that is adapted to advance a stacked configuration of layers used to form the composite nonwoven textile along a surface of the conveyance system in a material flow direction. Each entanglement station includes an actuator that, in one example aspect, is adapted to move in a direction perpendicular to the plane of conveyance of the surface. Each entanglement station further includes one or more entanglement heads coupled to the actuator. In one aspect, the entanglement heads include one or more entanglement needles arranged, in example aspects, in a structured arrangement. In one example, movement of the actuator in the direction perpendicular to the plane of conveyance of the surface causes the entanglement needles to engage the stacked configuration of layers. In another example, the actuator may remain stationary but actuate or cause the entanglement head and/or the entanglement needles to move up and down in a direction perpendicular to the plane of conveyance such that the entanglement needles engage the stacked configuration of layers. In another example aspect, the entanglement heads are adapted to emit one or more pressurized jets of fluid such as water. In this example, the actuator may also remain stationary and cause the jets of fluid to be emitted from the entanglement heads.

In example aspects, a carriage may also coupled to the entanglement heads, either directly or indirectly by way of the actuator, where the carriage is adapted to move in directions non-parallel to the material flow direction. Additionally or alternatively, the conveyance system may be adapted to move in directions non-parallel to the material flow direction. Thus, in example aspects, the entanglement heads and the conveyance system may be adapted to move relative to each other in directions non-parallel to the material flow direction.

In example aspects, the entanglement heads may be positioned at different locations on the respective entanglement stations in order to make contact with different portions of the stacked configuration as the stacked configuration is conveyed along the surface of the conveyance system. For instance, a first entanglement station may include a first entanglement head positioned a first distance inward (i.e., perpendicular to the material flow direction) from a side edge of the surface of the conveyance system, and a second entanglement station that is positioned subsequent to the first entanglement station may include a second entanglement head positioned a second distance inward from the side edge of the conveyance system where the second distance is different from the first distance.

In example aspects, the stacked configuration of layers includes a first nonwoven layer, a second layer, and a fill material positioned between the first nonwoven layer and the second layer. The stacked configuration is positioned on the surface of the conveyance system such that the first nonwoven layer faces upward or toward the actuator, the carriage, and the entanglement head of a first entanglement station and the second layer faces toward the surface of the conveyance system. In one example aspect when the entanglement head includes entanglement needles, while the composite nonwoven textile is in a first stationary phase, the actuator causes the entanglement head and/or the entanglement needles to move in a direction perpendicular to a plane of conveyance of the surface such that the entanglement needles, and indirectly the entanglement head, engage with the stacked configuration to form a first entanglement area. When the entanglement needles engage with the stacked configuration, the needles drive fibers from the first nonwoven layer through the fill material and into the second layer. In another example aspect when the entanglement head emits one or more pressurized jets of fluid, while the stacked configuration is in the first stationary phase, the actuator actuates the entanglement head to emit the one or more jets of fluid that contact the stacked configuration to form the first entanglement area. Alternatively, the stacked configuration may be continually advanced while the entanglement head continually emits one or more jets of fluid. In these aspects, when the jets of fluid contact the stacked configuration, the pressure of the jets drives fibers from the first nonwoven layer through the fill material and into the second layer When entanglement needles are used, the conveyance system then advances the stacked configuration of the first nonwoven layer, the second layer and the fill material in the material flow direction by a predefined amount. In example aspects, the predefined amount of advancement may be less than or equal to a dimension of the entanglement head in the material flow direction. Additionally, the entanglement head and/or the conveyance system may move in a direction non-parallel to the material flow direction by a predefined amount. In example aspects, the predefined amount of movement may be less than or equal to a dimension of the entanglement head in the direction non-parallel to the material flow direction. While the stacked configuration is in a second stationary phase and when the entanglement head includes entanglement needles, the actuator causes the entanglement head and/or the entanglement needles to move in the direction perpendicular to the plane of conveyance of the surface such that the entanglement needles engage with the stacked configuration to form a second entanglement area. When the entanglement head is adapted to emit one or more pressurized jets of fluid, the actuator actuates the entanglement head to emit the one or more jets of fluid to form the second entanglement area. The second entanglement area extends from the first entanglement area to form a non-linear entangled seam.

As the stacked configuration continues to advance through the first entanglement station, additional entanglement areas are formed that extend from the first and second entanglement areas such that the apparent continuous entangled seam is formed in the material flow direction. By moving the entanglement head and/or the conveyance system in directions non-parallel to the material flow direction, the continuous entangled seam becomes non-linear in the material flow direction. In example aspects, the first and second entanglement areas may partially overlap such that the overlap area represents an area where the entanglement needles and/or jets of fluid engage with the stacked configuration at least two times. In other example aspects, the first and second entanglement areas may not overlap but be positioned directly adjacent to each other to form an apparent continuous non-linear entangled seam. In still other aspects, the first and second entanglement areas may be spaced apart to form a discontinuous non-linear entangled seam. Any and all aspects, and any variation thereof, are contemplated as being within the scope herein.

The stacked configuration of the first nonwoven layer, the second layer, and the fill material may continue to advance through additional entanglement stations where additional non-linear entangled seams are formed that may be separate and distinct from the non-linear entangled seams formed by the first entanglement station. Stated differently, the additional non-linear entangled seams may be positioned at different locations along a direction non-parallel to the material flow direction. Depending on the number of entanglement stations in the entanglement system, the resulting composite nonwoven textile may have a short repeat of a visual arrangement of entangled seams, a long repeat of a visual arrangement of entangled seams, or no repeat of a visual arrangement of entangled seams.

The resulting composite nonwoven textile may include a plurality of non-linear entangled seams that extend in a material flow direction of the textile. As described, the entangled seams represent areas where fibers from the first nonwoven layer extend through the fill material and into the second layer. In example aspects, the fibers may extend through the second layer such that they extend outward from the second surface of the composite nonwoven textile. The composite nonwoven textile further includes regions where the first nonwoven layer, the second layer, and the fill material are substantially unentangled. The regions where the first nonwoven layer, the second layer, and the fill material are substantially unentangled have a greater thickness than the entangled seams. When the composite nonwoven textile is formed into a garment, the regions where the first nonwoven layer, the second layer, and the fill material are substantially unentangled would correspond to the "baffles" found in traditional insulating garments and are configured to store and retain heat to provide warmth while the entangled seams help to keep the fill material from drifting or shifting during wear.

The systems, methods, textiles, and garments described herein provide a number of advantages. For example, the composite nonwoven textile is easy and fast to manufacture requiring a minimal amount of materials (e.g., no adhesives, no stitching) and equipment (e.g., no heat press), and does not require post-processing steps where fill material is deposited into the baffles as with traditional constructions. This, in turn, reduces the carbon footprint associated with the manufacturing process. Moreover, the composite nonwoven textile may be formed of the same or similar materials (i.e., materials in the same polymer class). In one example aspect, each of the first nonwoven layer, the second layer, and the fill material may be formed from recycled polyester fibers. This allows the whole textile to be easily recycled by, for instance, shredding where the shredded material does not subsequently need to be sorted to remove disparate materials. Further, because the non-linear seams are formed by an entanglement process using, for instance, the recycled polyester fibers, the composite nonwoven textile does not include adhesives and/or threads used in stitching which reduces the need to remove these portions of the textile prior to recycling.

In example aspects, because the composite nonwoven textile may be formed of materials in the same polymer class and because the composite nonwoven textile may not include disparate materials such as threads, adhesives, and the like, a resulting garment formed from the composite nonwoven textile may be easily recycled by, for instance, shredding. Moreover, the shredded materials from the garment may subsequently be formed into one or more of the first nonwoven layer, the second layer, and the fill material to create a sustainable lifecycle for the garment. In line with this, scrap pieces generated during the making of the garment from the composite nonwoven textile may also be easily recycled by shredding, and the shredded materials from the scrap may subsequently be formed into one or more of the first nonwoven layer, the second layer, and the fill material.

An additional advantage of using the entanglement system and manufacturing methods described above is the ability to create complex visual arrangements of entangled seams. As used herein, the visual arrangement of entangled seams is collectively produced by the different shapes associated with each of the entangled seams, the spacing between the entangled seams, the number of the entangled seams, the width of the entangled seams, and the like. To create complex visual arrangements of the entangled seams, the entanglement heads may be positioned at different locations on the entanglement stations, the number and/or spacing of the entanglement heads at the different entanglement stations may be varied, the entanglement footprint produced by the entanglement heads may be varied, and the movement of the entanglement heads and/or the conveyance system in different directions non-parallel to the material flow direction may be varied. The complex visual arrangements of entangled seams may include those where entangled seams may cross-over each other, intersect, or be positioned closely together. Besides producing an interesting aesthetic, the ability to create areas where seams may cross-over each other, intersect, or be positioned closely together allows for the generation of a differential thickness of the composite nonwoven textile. For example, the areas where seams may cross-over each other or intersect represent instances where one or more entanglement heads from the entanglement stations engage with the composite nonwoven textile multiple times. Thus, these areas may have a reduced thickness compared to other entangled seam areas and compared to regions where the first nonwoven layer, the second layer, and the fill material are substantially unentangled. When the composite nonwoven textile is formed into a garment, these areas may be positioned adjacent to portions of the human body needing less insulation (based on, for example, heat maps of the human body) since these areas generally have less loft and less insulating properties compared to other regions of the composite nonwoven textile.

A further advantage of using the entanglement system and method of manufacturing described herein is the ability to produce a textile having a short repeat of the visual arrangement of entangled seams, a long repeat of the visual arrangement of entangled seams, or no repeat of the visual arrangement of entangled seams. This is accomplished by varying the number of entanglement stations aligned serially along the conveyance system. The ability to create a long repeat or no repeat using the entanglement system described herein addresses a potential disadvantage of traditional garment-making. Traditional garment-making that uses textiles with a short repeating visual arrangement of elements may generate material waste. This is because the pattern pieces used to form the garment are positioned in such a way to produce garments that have the same visual arrangement of elements at the same location on the garments. This often results in a high amount of scrap. The ability to create the composite nonwoven textile such that it has a long repeat or no repeat of the visual arrangement of entangled seams allows for the production of an array of garments having a common finished form but with a varied aesthetic due to a unique visual arrangement of entangled seams while having minimal material waste. When viewed as a garment array or lot, a consumer would recognize the garments as having a common origin and/or a common manufacturer but would be able to select a garment from the array that has a visual arrangement of entangled seams to their liking.

A further aspect related to the entanglement system and methods of manufacturing described herein is the ability to create non-linear entangled seams on one or more single nonwoven layers. The ability to create entangled seams on single layers also has advantages including easy and fast manufacturing with a minimal amount of materials (e.g., no adhesives, no stitching) and equipment (e.g., no heat press). This, in turn, reduces the carbon footprint associated with the manufacturing process. Moreover, the nonwoven textile may be formed of the same or similar materials (i.e., materials in the same polymer class). This allows the whole textile to be easily recycled by, for instance, shredding where the shredded material does not subsequently need to be sorted to remove disparate materials. Further, because the non-linear seams are formed by an entanglement process using, for instance, the recycled polyester fibers, the nonwoven textile does not include adhesives and/or threads used in stitching which reduces the need to remove these portions of the textile prior to recycling.

The single nonwoven layer may include a single fiber layer (e.g., a lightly entangled fiber web), multiple fiber layers that are entangled with each other, fiber layers entangled with other materials such as elastomeric layers, textile layers, and the like. In example aspects, once the non-linear entangled seams are created on an individual nonwoven layer, the nonwoven layer may be formed into, for example, an article of apparel. In other example aspects, different nonwoven layers having non-linear entangled seams may be positioned adjacent to each other with optional additional layers (nonwoven, knit, woven, films, and the like) positioned therebetween, and the different layers may be secured together using entanglement, sewing, bonding, and the like. Any and all aspects, and any variation thereof, are contemplated as being within the scope herein.

As used herein, the term "garment" or "article of apparel" is intended to encompass articles worn by a wearer. As such, they may include upper-body garments (e.g., tops, t-shirts, pullovers, hoodies, jackets, coats, and the like), and lower-body garments (e.g., pants, shorts, tights, capris, unitards, and the like). Garments may also include hats, gloves, sleeves (arm sleeves, calf sleeves), articles of footwear such as uppers for shoes, and the like. The term "inner-facing surface" when referring to the garment means the surface that is configured to face towards a body surface of a wearer when the garment is worn as intended, and the term "outer-facing surface" means the surface that is configured to face away from the body surface of the wearer and toward an external environment when the garment is worn as intended. The term "innermost-facing surface" means the surface closest to the body surface of the wearer with respect to other layers of the garment, and the term "outermost-facing surface" means the surface that is positioned furthest away from the body surface of the wearer with respect to the other layers of the garment. The term "pattern" or "pattern piece" used in relation to constructing a garment means that the pattern or pattern piece has a perimeter shape that corresponds to a structure on a finished garment such as, for example, a sleeve, a front torso panel, a collar, and the like. The pattern or pattern piece is used when removing, extracting, or cutting portions of a textile that have a perimeter shape corresponding to the pattern or pattern piece where the portions of the textile are assembled to form a garment using, for example, a traditional cut-and-sew construction.

As used herein, the term "composite nonwoven textile" encompasses any textile that includes at least one nonwoven layer in combination with other layers whether the layers may be substantially unaffixed from each other except for the entangled seams. Thus, it is contemplated herein that the composite nonwoven textile be entirely formed from nonwoven layers. It is also contemplated herein that a nonwoven layer may be combined with other constructions such as fibrous materials, films, woven layers, knit layers, braided layers, and the like. It is contemplated herein that the term "composite nonwoven textile" encompasses a stacked configuration of layers and one more entangled seams that join the layers forming the stacked configuration at the seam areas.

The term "nonwoven layer" refers to a layer where fibers are held together by mechanical and/or chemical interactions without being in the form of a knit, woven, braided construction, or other structured construction. In a particular aspect, the nonwoven layer includes a collection of fibers that are mechanically or chemically manipulated to form a mat-like material. Stated differently the nonwoven layer is directly made from fibers. The composite nonwoven textile described herein may include different layers formed into a cohesive structure, where the different layers may have a different or similar composition of fibers or yarns and/or different properties. In one example, the first nonwoven layer and optionally the second layer may include a spunbond layer. As used herein, a spunbond layer is formed by spinning continuous filaments of a polymer material that have been melted onto a moving belt and bonding the filaments together using, for instance, a calendaring process. Spunbond nonwovens typically have a soft hand and are strong and durable. They also generally have a smooth surface suitable for printing including digital printing with digital printing heads. In another example aspect, the first nonwoven layer and optionally the second layer may include a spunlace layer. As used herein, a spunlace layer includes a web of fibers that are entangled by way of, for example, hydroentanglement. Aspects herein contemplate that the fill material may comprise an entangled web of fibers that forms a sheet-like material. In example aspects, the fibers may be resin bonded to form a cohesive structure. Other aspects herein contemplate that the fill material includes loose synthetic fibers/filaments, down, or a combination of any of the above.

The term "substantially unentangled" when referring to the composite nonwoven textile refers to a region of the composite nonwoven textile in which the layers have not been entangled with each other such that the layers are independently movable with respect to each other or in which one or more of the layers have been lightly entangled with each other. The term "entangled seam" when referring to the composite nonwoven textile refers to an area of the composite nonwoven textile in which the layers of the composite nonwoven textile have undergone mechanical entanglement with each other by way of, for example, needlepunching or hydroentanglement. As such, the different layers of the composite nonwoven textile in the seam area may include fibers originally present in a particular layer as well as fibers that are present in other layers, including additional nonwoven layers, or fill material that have been moved through the entanglement process into the layer. When describing that the entangled seam is "non-linear" it is contemplated herein that the distance between a non-linear entangled seam and a linear edge of the composite nonwoven textile may vary along a material flow direction of the nonwoven textile. Aspects herein contemplate that the seam may include linear segments, curved segments, curvilinear segments, and the like that alone or in combination form the non-linear entangled seam. In example aspects, the distance between adjacent non-linear entangled seams may vary along a material flow direction of the composite nonwoven textile.

The mechanical entanglement process contemplated herein may include needle entanglement (commonly known as needlepunching) using barbed or structured needles (e.g., forked needles) known herein as entanglement needles, or fluid entanglement which is known herein as hydroentanglement. Needlepunching generally uses entanglement needles to reposition a percentage of fibers from a generally horizontal orientation (an orientation extending along an x, y plane) to a generally vertical orientation (a z-direction orientation). Referring to the needlepunching process in general, the layers forming the composite nonwoven textile may be stacked, and entanglement needles associated with an entanglement head pass in and out through the stacked configuration. Thus, when describing that an entanglement head engages with a nonwoven textile, it is contemplated herein that the entanglement needles associated with the entanglement head engage with the nonwoven textile. A stripper plate may be used that strips the fibers from the needles after the needles have moved in and out of the stacked configuration. Each engagement of the entanglement head with the stacked configuration is known herein as a "pass." Parameters associated with entanglement head may be adjusted to achieve desired properties of the resulting composite nonwoven textile (e.g., basis weight, thickness, and the like) as explained further below.

The barbs on the entanglement needle "capture" fibers as the barb moves from the first nonwoven layer through the stacked configuration. The movement of the entanglement needle effectively moves or pushes fibers captured by the barbs from a location near or at the surface of the first nonwoven layer to a location near or at the surface of the second layer and further causes physical interactions with other fibers helping to "lock" the moved fibers into place through, for example, friction. It is also contemplated herein that the entanglement needles may pass through the stacked configuration from the second layer in a direction toward the first nonwoven layer. It is also contemplated herein that the entanglement needles may pass through the stacked configuration from the first nonwoven layer toward the second layer and from the second layer toward the first nonwoven layer. Hydroentanglement works similar to needlepunching except instead of using entanglement needles, pressurized jets of a fluid (e.g., water) move the fibers through the different layers. Parameters associated with the hydroentanglement process such as the pressure of the fluid jets, the number of fluid jets, the rate of conveyance, and the like, may be adjusted to achieve a desired degree of entanglement.

The term "entanglement head" is used herein to describe a structure that includes one or more entanglement needles in a defined arrangement and/or one or more orifices for emitting pressurized jets of fluid in a defined arrangement. When the entanglement needles and/or jets of fluid engage with a composite nonwoven textile via the entanglement head, they may form an entanglement footprint. As used herein, the term "entanglement footprint" is the structured arrangement of entanglement points produced by an entanglement head on the composite nonwoven textile. For example, depending on the defined arrangement of the entanglement needles and/or orifices in the entanglement head, the entanglement footprint may have a circular shape, a square shape, a rectangular shape, a triangular shape, and the like.

The term "material flow direction" as used herein means the direction at which a material advances along a conveyance system. The material flow direction may also be known as the machine direction. Thus, when describing that a composite nonwoven textile includes non-linear entangled seams that extend in the material flow direction, the non-linear entangled seams extend in the direction of advancement of the composite nonwoven textile along a conveyance system of an entanglement system. As described herein, an entanglement head, or jets of fluid when hydroentanglement is used, may move in a direction perpendicular to a plane of conveyance of the conveyance system. To describe this differently, if the plane of conveyance extends along an x, y plane, and the material flow direction extends in a positive x-direction, then the entanglement head or the jets of fluid may move in a positive or negative z-direction. When describing that a carriage or the conveyance system moves in directions non-parallel to the material flow direction, it is contemplated herein that the carriage and/or the conveyance system move in a generally positive or negative y-direction. This also may be known as the cross-machine direction.

Fibers used to form the nonwoven layers and other layers contemplated herein may be formed of a number of different materials (e.g., cotton, nylon and the like) including polyethylene terephthalate (PET) commonly known as polyester. The PET fibers may include virgin PET fibers (fibers that have not been recycled), and recycled PET fibers. Recycled PET fibers include shredded PET fibers derived from shredded articles and re-extruded PET fibers (fibers that are re-extruded using recycled PET chips).

Various measurements are provided herein with respect to the composite nonwoven textile. Thickness of the resulting composite nonwoven may be measured using a precision thickness gauge. To measure thickness, for example, the textile may be positioned on a flat anvil and a pressure foot is pressed on to it from the upper surface under a standard fixed load. A dial indicator on the precision thickness gauge gives an indication of the thickness in mm. Basis weight is measured using ISO3801 testing standard and has the units grams per square meter (gsm). Thermal resistance, which generally corresponds to insulation features, is measured using ISO11092 testing standard and has the units of RCT ($M^2*K/W$). Unless otherwise noted, all measurements provided herein are measured at standard ambient temperature and pressure (25 degrees Celsius or 298.15 K and 1 bar) with the nonwoven textile in a resting (un-stretched) state.

FIG. 1 depicts a first surface 101 of a composite nonwoven textile 100 where the first surface 101 is formed of a first nonwoven layer 110. In example aspects, the first nonwoven layer 110 may include a spunbond or spunlace material although other nonwoven constructions are contemplated herein. Spunbond or spunlace materials generally have a soft hand and are durable making them suitable for incorporation into a garment. The first nonwoven layer 110 is formed from entangled fibers as indicated by reference numeral 112. When the composite nonwoven textile 100 is incorporated into a garment, the first surface 101 may be positioned as an inner-facing surface or an innermost-facing surface of the garment. Alternatively, the first surface 101 may be positioned as an outer-facing surface or an outermost-facing surface of the garment.

The composite nonwoven textile 100 also includes a second layer 114 which will be described in greater detail with respect to FIGS. 2A and 2B. A fill material 116 is positioned between the first nonwoven layer 110 and the second layer 114. The fill material 116 may include a fiber sheet having entangled fibers that may optionally be resin bonded to maintain a more cohesive structure, a lightly entangled web of fibers, a carded web, loose synthetic fibers, down, and the like.

As shown in FIG. 1, the composite nonwoven textile 100 may include a plurality of non-linear entangled seams 118 that extend in a material flow direction 105 of the composite nonwoven textile 100. The entangled seams 118 represent areas where fibers from the different layers are entangled with each other. In one example aspect, the entangled seams 118 represent areas where fibers from the first nonwoven layer 110 extend through the fill material 116 and into the second layer 114. Regions 122 of the composite nonwoven textile 100 that are located between the entangled seams 118 represent regions where the first nonwoven layer 110, the second layer 114, and the fill material 116 are substantially unentangled such that the different layers are not secured or affixed or are lightly secured or affixed to one another at the regions 122. As shown, the regions 122 have more loft or a greater thickness than the entangled seams 118 and may help to store and retain heat when the composite nonwoven textile 100 is incorporated into a garment. In turn, the entangled seams 118 may help to prevent shifting or drift of the fill material 116 when a garment incorporating the composite nonwoven textile 100 is worn.

With respect to at least entangled seam 118a, a distance between the entangled seam 118a and a linear first edge 120 of the composite nonwoven textile 100 varies along the material flow direction 105 of the composite nonwoven textile 100. For example, a first distance 124 between the entangled seam 118a and the first edge 120 may be less than a second distance 126 between the entangled seam 118a and the first edge 120. This also holds true for the other entangled seams 118 shown in FIG. 1. As depicted, the entangled seams 118 may include linear segments that extend from each other, curves, and combinations of the above. The depiction of the shape of the individual entangled seams 118, the number of entangled seams 118, the spacing between adjacent entangled seams 118, and the overall visual arrangement of the entangled seams 118 is illustrative and it is contemplated herein that the entangled seams 118 may include other non-linear shapes, a different number of entangled seams 118, different spacing, and a different overall visual arrangement of the entangled seams 118.

Figures 2A, 2B:
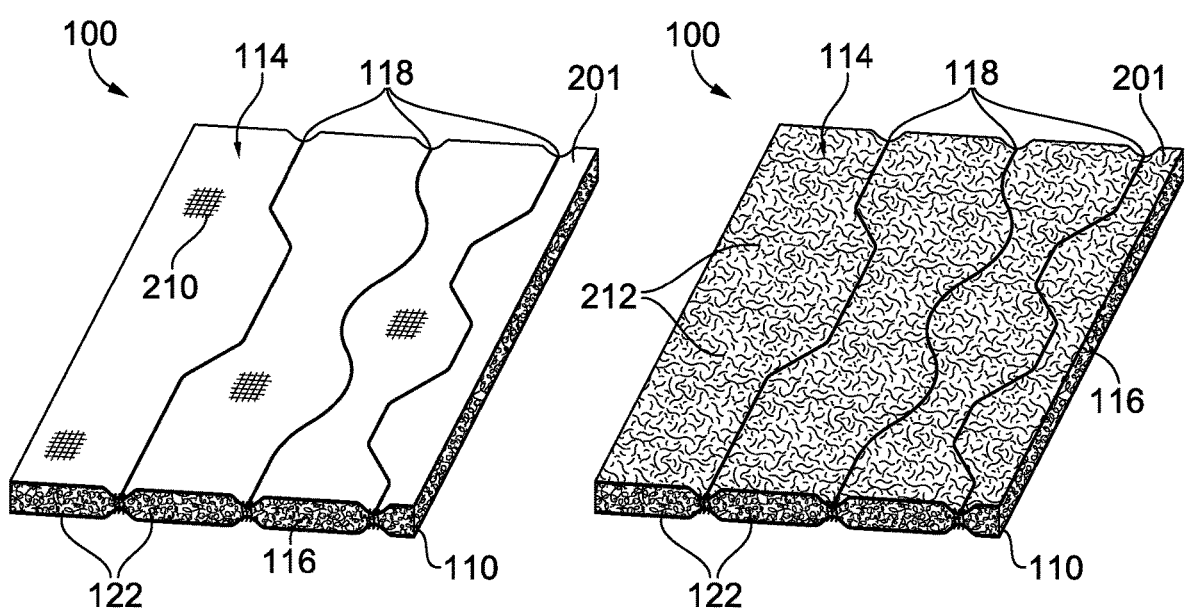
FIG. 2A illustrates a first example opposite second surface of the composite nonwoven textile of FIG. 1 where the second surface is formed from a woven textile in accordance with aspects herein.
FIG. 2B illustrates a second example opposite second surface of the composite nonwoven textile of FIG. 1 where the second surface is formed from a nonwoven textile in accordance with aspects herein.

FIG. 2A illustrates an opposite second surface 201 of the composite nonwoven textile 100 where the second surface 201 is formed by the second layer 114. In one example aspect as shown in FIG. 2A, the second layer 114 may include a woven layer as indicated by the example interlaced warp and weft yarns 210. In this example, when the composite nonwoven textile 100 is incorporated into a garment, the second layer 114 may be positioned to be an outer-facing surface or an outermost-facing surface of the garment. Woven materials in general have a high resistance to abrasion and may act as an effective wind barrier due to the tight weave construction making them suitable for forming outer-facing surfaces of garments. In example aspects, the woven material may be treated with a durable water repellant to impart water resistance properties to the composite nonwoven textile 100. The non-linear entangled seams 118 are shown extending through the composite nonwoven textile 100 such that they are present on the second surface 201 of the textile 100.

FIG. 2B illustrates a second example where the second layer 114 is formed from a nonwoven material such as a spunbond or spunlace material. Entangled fibers forming the second layer 114 are indicated by reference numeral 212. The non-linear entangled seams 118 extend through the composite nonwoven textile 100 such that they are present on the second surface 201 of the textile 100 in FIG. 2B.

Figure 3:
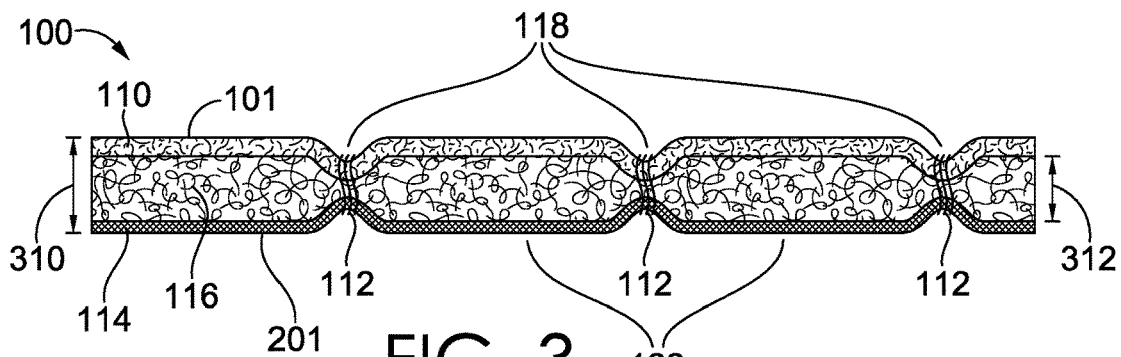
FIG. 3 illustrates a cross-section of the composite nonwoven textile taken at cut line 3-3 of FIG. 1 in accordance with aspects herein.

FIG. 3 depicts a cross-section of the composite nonwoven textile 100 taken at cut line 3-3 of FIG. 1. The first nonwoven layer 110, the second layer 114, and the fill material 116 are indicated where the fill material 116 is positioned between the first nonwoven layer 110 and the second layer 114. At the regions 122, each of the first nonwoven layer 110, the second layer 114, and the fill material 116 are substantially unentangled such that the first nonwoven layer 110, the second layer 114, and the fill material 116 remain generally separate and distinct layers having a combined thickness 310 as measured from the first surface 101 to the second surface 201.

The fibers 112 from the first nonwoven layer 110 are shown extending through the fill material 116 and the second layer 114 at the entangled seams 118 such that the entangled seams 118 secure the different layers together at the seam areas. In one example aspect, the fibers 112 may extend through the second layer 114 such that they extend away from the second surface 201 of the composite nonwoven textile 100 as shown in FIG. 3. In this example, the fibers 112 may be left unmodified such that the second surface 201 presents a fuzzy surface at the entangled seams 118. In another example, the fibers 112 may be removed, compressed, or melted. For example, a calendaring process may be used to compress the fibers 112 such that they do not extend from the second surface 201. In another example, the fill material 116 may include low-melt fibers, and any low-melt fibers extending from the second surface 201 may be removed by the application of heat. Additionally, a shaving process could be used to remove the fibers 112 if desired. In another example aspect, the fibers 112 may extend into the second layer 114 but not extend through the second layer 114 such that the fibers 112 are generally not present on the second surface 201 of the composite nonwoven textile 100.

The entangled seams have a thickness 312 that is less than the thickness 310 at the regions 122. In one example aspect, the thickness 310 may be from about 7 mm to about 15 mm, from about 8 mm to about 13 mm, from about 9 mm to about 11 mm, or about 10 mm. As used herein, the term "about" means within ±10% of an indicated value. In example aspects, the thickness 312 may be from about 5 mm to about 0.2 mm, from about 4 mm to about 1 mm, from about 3 mm to about 1.5 mm, or about 2 mm. As such, in example aspects, the thickness 312 of the entangled seams 118 may be from about 5% to about 30% of the thickness 310 of the regions 122.

Figure 4A:
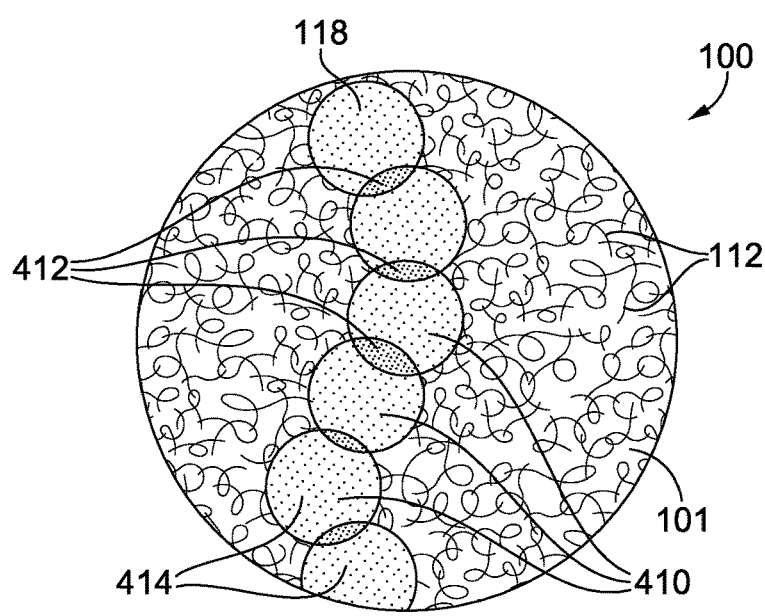
FIG. 4A illustrates an enlarged view of a portion of a first example non-linear entangled seam in accordance with aspects herein.

FIG. 4A illustrates an enlarged view of one of the entangled seams 118 of the composite nonwoven textile 100 as viewed form the first surface 101 of the composite nonwoven textile 100. A view of the entangled seam 118 from the second surface 201 would be similar. FIG. 4A illustrates a first example way that the entangled seam 118 may be formed. In example aspects, the entangled seam 118 may be formed from discrete entanglement areas 410 that partially overlap each other at overlap areas 412. Each of the discrete entanglement areas 410 has an entanglement footprint. For instance, the entanglement footprint of the entanglement areas 410 is depicted as having a circular form but this is illustrative and dependent on the structured arrangement of the entanglement needles and/or orifices in the entanglement head used to form the entanglement areas 410. As shown, the entanglement areas 410 extend from each other in a non-linear manner to form an apparent continuous non-linear entangled seam.

The individual dots within the entanglement areas 410 represent entanglement points 414 where either an entanglement needle or a fluid jet engages with the composite nonwoven textile 100 to entangle fibers. The number of the entanglement points 414 per $cm^2$ may be known herein as a stitch density. The stitch density is dependent upon, for example, the number of entanglement needles associated with the entanglement head, the number of fluid jets emitted by the entanglement head, the structured arrangement of the entanglement needles and/or jet orifices, and the like. A greater stitch density may result in a reduced thickness at the entangled seams 118 compared to a lesser stitch density since a greater stitch density generally means a greater degree of fiber entanglement.

The overlap areas 412 represent areas where the entanglement head engages with the composite nonwoven textile more than one time. As such, the number and/or density of the entanglement points 414 within the overlap areas 412 is greater than the number and/or density of the entanglement points 414 at remaining portions of the entanglement areas 410. Stated differently, the stitch density of the overlap areas 412 is greater than the stitch density at remaining portions of the entanglement areas 410. A result of this is that the overlap areas 412 may have a reduced thickness as compared to remaining portions of the entanglement areas 410.

Figure 4B:
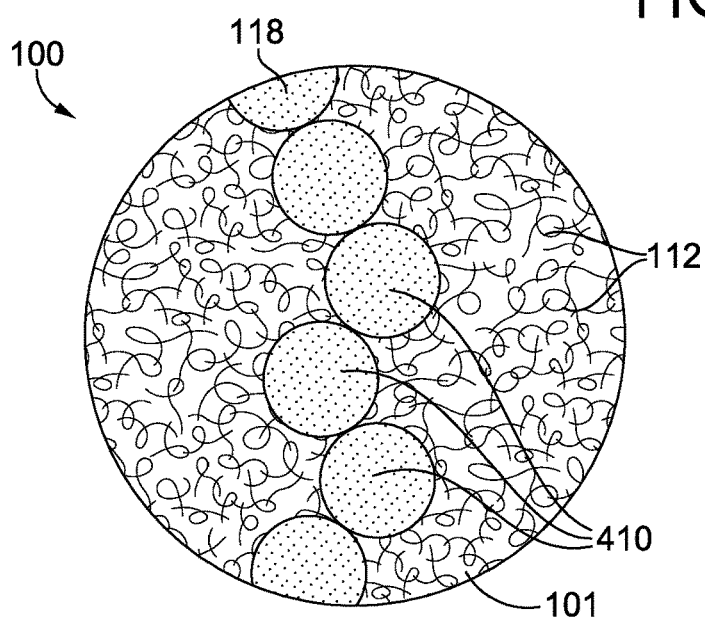
FIG. 4B illustrates an enlarged view of a portion of a second example non-linear entangled seam in accordance with aspects herein.

FIG. 4B illustrates a second example way that the entangled seam 118 may be formed. In this aspect, the entanglement areas 410 extend from one another in a non-linear manner to form an apparent continuous entangled seam. The entanglement areas 410, however, do not partially overlap each other as in FIG. 4A. Instead, the entanglement areas 410 may be positioned directly adjacent to each other such that an entanglement point 414 of a first entanglement area 410 may share a common border with an entanglement point 414 of an adjacent second entanglement area 410. With respect to the non-linear entangled seams 118, the entangled seams 118 may include the configuration shown in FIG. 4A, the configuration shown in FIG. 4B, or a combination of the configurations shown in FIG. 4A and FIG. 4B. It is also contemplated herein that the entanglement areas 410 may be spaced apart from one another to form a discontinuous non-linear entangled seam.

FIG. 5 is a schematic depiction of a side view of an example entanglement system 500. The depiction of the different components of the entanglement system 500 is illustrative only and does not represent the actual configuration or structure of the components. The entanglement system 500 includes a conveyance system 512 having a surface 514 adapted to advance a stacked configuration of, for example, the first nonwoven layer 110, the second layer 114, and the fill material 116 in a material flow direction as indicated by arrows 516. As described further with respects to FIGS. 18 and 19, in another aspect, the conveyance system 512 may advance a single nonwoven layer, such as the first nonwoven layer 110 in the material flow direction 516. The conveyance system 512 may include conveyance systems known in the art such as rollers, belts, and the like. The advancement of the conveyance system 512 may, in example aspects, include stationary phases or positions and movement phases in the material flow direction 516. The duration of the stationary phases and movement phases may be adjusted to achieve one or more desired features in the resulting composite nonwoven textile. For example, the duration of the stationary phases may be adjusted to achieve more or less entanglement of the resulting entangled seams. Stated differently, longer stationary phases may allow for more passes of entanglement needles at an entanglement area, a greater stitch density at the entanglement area, and a greater degree of entanglement at the entanglement area. The distance of advancement during the movement phases may also be adjusted to achieve a desired feature in the resulting composite nonwoven textile. For example, increasing the distance of advancement during the movement phases may cause the entanglement areas to not overlap or even be spaced apart from each other while decreasing the distance of advancement during the movement phases may increase the amount of overlap between adjacent entanglement areas. The speed of conveyance during the movement phases may be adjusted to increase and/or decrease production times.

The entanglement system 500 further includes a number of entanglement stations such as entanglement stations 518, 520, and 522. Although only three entanglement stations are depicted, it is contemplated herein that there may a greater number or a fewer number of entanglement stations than shown in FIG. 5. The entanglement stations 518, 520, and 522 are aligned serially along the conveyance system 512 in the material flow direction 516. In example aspects, including a greater number of entanglement stations in the entanglement system 500 creates a resulting composite nonwoven textile having a long repeat or no repeat of the visual arrangement of non-linear entangled seams. Including a fewer number of entanglement stations in the entanglement system 500 creates a resulting composite nonwoven textile having a short repeat of the visual arrangement of non-linear entangled seams. Thus, the number of entanglement stations that are part of the entanglement system 500 may be customized to achieve a desired repeat length of the visual arrangement of non-linear entangled seams.

The components associated with the different entanglement stations 518, 520, and 522 may be substantially similar and, as such, the components associated with the entanglement station 518 will be described herein with the understanding that the description of the components also applies to the entanglement stations 520 and 522. The entanglement station 518 includes a carriage 524 slidably coupled to, for example, a mount 526. The carriage 524 is adapted to move in directions non-parallel to the material flow direction 516. Alternatively, the carriage 524 may not be used when the conveyance system 512 is adapted to move in directions non-parallel to the material flow direction 516. In example aspects, the carriage 524 and/or the conveyance system 512 are adapted to move in directions perpendicular to the material flow direction 516 toward both a first side edge and an opposite second side edge of the conveyance system 512 (i.e., in a positive and negative y-direction).

The entanglement station 518 further includes an actuator 528 coupled to the carriage 524. In one example aspect and as shown in FIG. 5, the actuator 528 is adapted to move in a direction perpendicular to a plane of conveyance of the surface 514 of the conveyance system 512 as indicated by arrow 530. In other example aspects, the actuator may remain stationary and the actuator may actuate entanglement heads and/or entanglement needles to move in the direction perpendicular to the plane of conveyance of the surface 514 of the conveyance system 512. In still other example aspects, and as described in relation to FIG. 6B, the actuator 528 may remain stationary and the actuator may actuate entanglement heads to emit jets of fluid. An entanglement head 532 is coupled to the actuator 528 and may be indirectly coupled to the carriage 524 by way of the actuator 528. In the example shown in FIG. 5, the entanglement head 532 may include one or more entanglement needles 534 that extend toward the surface 514 of the conveyance system 512. Although only one entanglement needle 534 is depicted, it is contemplated herein that the entanglement head 532 may include multiple entanglement needles as further described with respect to FIGS. 9A and 9B.

FIG. 6A depicts a front view of the entanglement station 518 depicting the mount 526, the carriage 524, the actuator 528, the entanglement head 532, and the entanglement needle 534. Arrow 610 represents a first direction of movement of the carriage 524 and/or conveyance system 512 in the direction non-parallel to the material flow direction 516, and arrow 611 represents an opposite second direction of movement of the carriage 524 and/or conveyance system 512 in the direction non-parallel to the material flow direction 516. In example aspects, the first and second directions 610 and 611 are perpendicular to the material flow direction 516.

The front view of the entanglement station 518 depicts three entanglement heads 532a, 532b, and 532c spaced generally evenly apart where the three entanglement heads 532a, 532b, and 532c are each adapted to form a respective non-linear entangled seam. This is illustrative only and it is contemplated herein that there may be more than the three entanglement heads 532a, 532b, and 532c or fewer than the three entanglement heads 532a, 532b, and 532c. As well, the spacing between the entanglement heads 532a, 532b, and 532c may vary such that a spacing between a first and second entanglement head 532 of the entanglement heads 532a, 532b, and 532c may be greater than a spacing between the second and a third entanglement head 532 of the entanglement heads 532a, 532b, and 532c. As explained with respect to FIGS. 9A and 9B, the entanglement heads 532a, 532b, and 532c may have different dimensions, a different structured arrangement of entanglement needles and/or orifices, and the like.

FIG. 6B depicts a front view of an alternative entanglement station 612 that may be part of an entanglement system such as the entanglement system 500 that is adapted to hydroentangle layers to create a composite structure instead of needlepunching the layers to create a composite structure. As such the entanglement station 612 may be representative of multiple hydroentanglement stations that are part of the entanglement system 500.

The entanglement station 612 also includes a mount 614 to which a carriage 616 is slidably coupled, an actuator 618 coupled to the carriage 616, and an entanglement head 620 coupled to the actuator 618. The carriage 616 and/or conveyance system 512 is adapted to move in a first direction non-parallel to the material flow direction 516 as indicated by arrow 622 and in an opposite second direction 623 non-parallel to the material flow direction 516. In example aspects, the directions 622 and 623 are perpendicular to the material flow direction 516. In example aspects, the actuator 618 may not move in the direction 530 perpendicular to the plane of conveyance of the surface 514. Instead, in example aspects, the actuator 618 is adapted to actuate the entanglement head 620 to emit one or more pressurized jets of fluid 624 that extend toward the surface 514 of the conveyance system 512. With respect to this aspect, it is contemplated herein that the conveyance system 512 may intermittently advance as described above where the jets of fluid 624 are emitted when the conveyance system 512 is in a stationary phase. Alternatively, the conveyance system 512 may be continually advanced and the jets of fluid 624 may be continually emitted from the entanglement head 620. Similar to the entanglement station 518, the number of entanglement heads 620 may be different from that shown, the spacing between entanglement heads 620 may vary from that shown, and the entanglement heads 620 may have different dimensions, a different structured arrangement of orifices, and the like.

FIG. 7 depicts the second entanglement station 520 where the second entanglement station 520 includes the same components as the entanglement station 518 (e.g., mount 526, carriage 524, actuator 528, and entanglement head 532). Two entanglement heads 532d and 532e are depicted for the second entanglement station 520. In example aspects, the entanglement heads 532d and 532e may be positioned such that they do not align in the material flow direction 516 with the entanglement heads 532a, 532b, and 532c. The result of this is that the entanglement heads 532d and 532e are adapted to engage with the composite nonwoven textile at different locations in a direction non-parallel to the material flow direction 516 as compared to the entanglement heads 532a, 532b, and 532c. Stated differently, the entanglement heads 532d and 532e are adapted to form a set of non-linear entangled seams that are distinct and separate from the non-linear entangled seams formed by the entanglement heads 532a, 532b, and 532c. For instance, the entanglement head 532a may be offset from a first edge 660 of the surface 514 of the conveyance system 512 in a direction perpendicular to the material flow direction 516 by a first distance 613, and the entanglement head 532d may be offset from the first edge 660 of the surface 514 of the conveyance system 512 in the direction perpendicular to the material flow direction 516 by a second distance 615 where the second distance 615 is greater than the first distance 613. As such, a spacing arrangement between the entanglement heads 532d and 532e differs from a spacing arrangement between the entanglement heads 532a, 532b, and 532c. As shown, the entanglement station 520 includes a different number of entanglement heads 532 than the number of entanglement heads 532 at the entanglement station 518. It is contemplated herein that the entanglement station 520 may include fewer entanglement heads than shown or a greater number of entanglement heads than shown. The dimensions of the entanglement heads 532e and 532d may be the same or different from the dimensions of the entanglement heads 532a, 532b, and 532c. Additionally, the entanglement footprint produced by the entanglement heads 532e and 532d may be the same or different from the entanglement footprint produced by the entanglement heads 532a, 532b, and 532c.

FIG. 8 depicts the third entanglement station 522 where the third entanglement station 522 includes the same components as the entanglement stations 518 and 522. Two entanglement heads 532f and 532g are depicted for the third entanglement station 522. In example aspects, the entanglement heads 532f and 532g may be positioned such that they do not align in the material flow direction 516 with the entanglement heads 532a, 532b, 532c, 532d, and 532e. Thus, the entanglement heads 532f and 532g are adapted to form another set of non-linear entangled seams that are distinct and separate from the non-linear entangled seams formed by the entanglement heads 532a, 532b, 532c, 532d, and 532e. Stated differently, the entanglement heads 532f and 532g may be offset from the first edge 660 of the surface 514 of the conveyance system 512 by distances that are different than the distances of offset for the entanglement heads 532a, 532b, 532c, 532d, and 532e. The entanglement station 522 may include a different number of entanglement heads 532 than that shown. The entanglement heads 532f and 532g may also be spaced differently from that shown. The dimensions of the entanglement heads 532f and 532g may be the same or different from the dimensions of the entanglement heads 532a, 532b, 532c, 532d, and 532e. In addition, the entanglement footprint produced by the entanglement heads 532f and 532g may be the same or different from the entanglement footprint produced by the entanglement heads 532a, 532b, 532c, 532d, and 532e.

Although the entanglement system 500 is depicted as including multiple entanglement stations positioned serially along the conveyance system 512 in the material flow direction 516, it is also contemplated herein that the entanglement system 500 may include one entanglement station such as the entanglement station 518. In this aspect, the stacked configuration of the first nonwoven layer 110, the second layer 114, and the fill material 116 may be passed through the entanglement station 518 multiple times to form the resulting composite nonwoven textile 100. In this aspect, the positioning of the entanglement heads 532a, 532b, and 532c may be adjusted between each pass such that different areas of the stacked configuration are engaged by the entanglement heads 532a, 532b, and 532c during each pass. As well, different entanglement heads may be added, existing entanglement heads may be removed, and the like. The movement of the carriage 524 may also be adjusted during each pass such that the entanglement heads 532a, 532b, and 532c engage with different portions of the stacked configuration.

The illustrative entanglement system 500 shown in FIG. 5 and described further with respect to FIGS. 6A-8 may produce a complex visual arrangement of non-linear entangled seams that extend in the material flow direction 516. The components and movements of the entanglement system 500 may be adjusted to create non-linear entangled seams that are spaced closely together or are spaced further apart. Additionally, the system 500 may create non-linear entangled seams that cross over each other or intersect one or more times along a particular entangled seam's material flow direction. As described further with respect to FIGS. 14-16, this creates a differential thickness of a resulting composite nonwoven textile in the first and second directions 610 and 611 non-parallel or perpendicular to the material flow direction 516 (i.e., along a cross-section of the resulting composite nonwoven textile).

FIGS. 9A and 9B depict bottom up views of two example entanglement heads 920 and 922 respectively. The entanglement heads 920 and 922 may be any of the entanglement heads described in relation to the entanglement system 500 or the entanglement station 612. With respect to the entanglement head 920, it includes a structured arrangement of entanglement needles 924 or, alternatively, orifices 924 adapted to emit jets of fluid. The entanglement head 920 has an example circular shape such that the entanglement needles 924 or orifices 924 are adapted to form a circular entanglement footprint on a composite nonwoven textile. The entanglement head 920 has a dimension 910 in the material flow direction and a dimension 912 in the first and second directions 610 and 611 non-parallel or perpendicular to the material flow direction 516. Because the entanglement head 920 has a circular shape, the dimensions 910 and 912 are equivalent to the diameter of the entanglement head 920 and are equal.

The entanglement head 922 also includes a structured arrangement of entanglement needles 926 or, alternatively, orifices 926 adapted to emit jets of water. The entanglement head 922 has an example rectangular shape such that the entanglement needles 926 or orifices 926 are adapted to form a rectangular entanglement footprint on a composite nonwoven textile. The entanglement head 922 has a dimension 914 in the material flow direction 516 and a dimension 916 in the first and second directions 610 and 611 non-parallel or perpendicular to the material flow direction 516.

In example aspects, the distance of advancement of the conveyance system 512 in the material flow direction 516 during the movement phases of the entanglement system 500 may be less than or equal to the dimensions 910 and 914 of the respective entanglement heads 920 and 922. This ensures that the entanglement areas produced by the entanglement heads 920 and 922 are directly adjacent to each other and/or overlap to form an apparent continuous non-linear entangled seam. Further, the movement of the carriage 524 and/or conveyance system 5120 in the first and second directions 610 and 611 non-parallel or perpendicular to the material flow direction 516 may be less than or equal to the dimensions 912 and 916 of the respective entanglement heads 920 and 922. This further ensures that the entanglement areas produced by the entanglement heads 920 and 922 are directly adjacent to each other and/or overlap to form the apparent continuous non-linear entangled seam. The depiction of the shapes of the entanglement heads 920 and 922 is illustrative and it is contemplated herein that the entanglement heads may have other shapes such as oval, square, triangular, and the like.

Figure 10A:
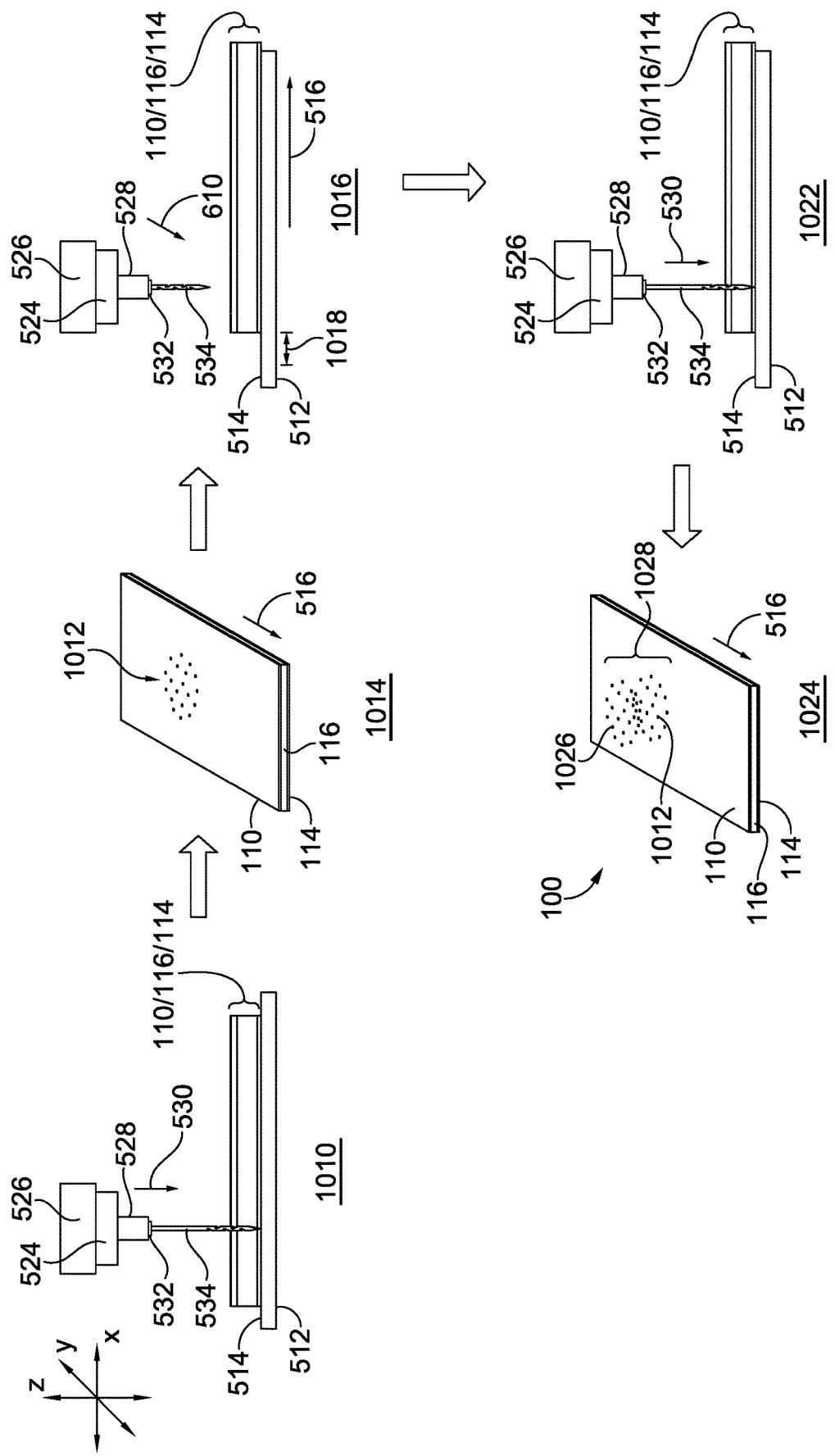
FIG. 10A illustrates a schematic of an example process for forming a non-linear entangled seam using the entanglement station of FIG. 6A in accordance with aspects herein.
Figure 10B:
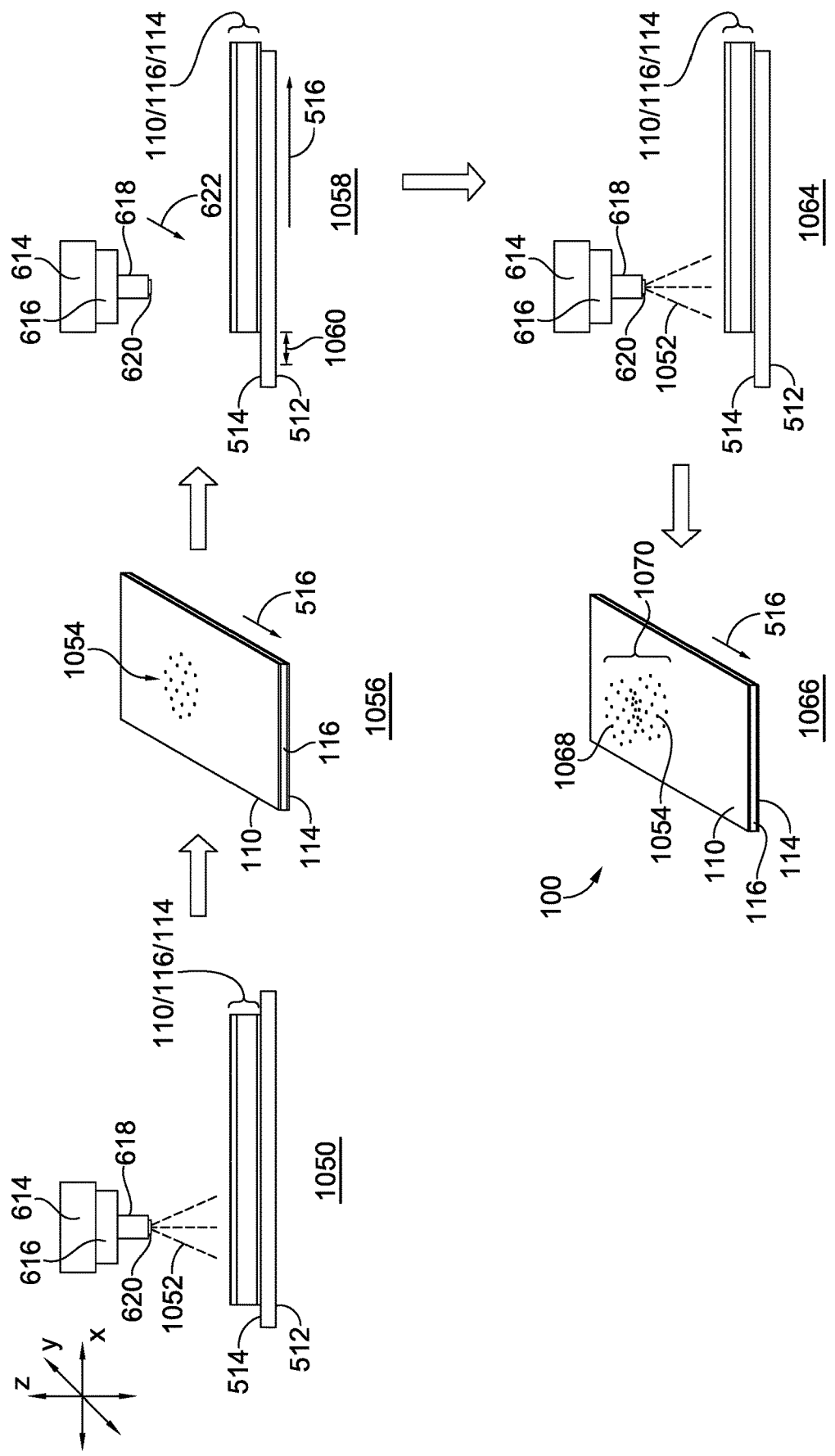
FIG. 10B illustrates a schematic of an example process for forming a non-linear entangled seam using the entanglement station of FIG. 6B in accordance with aspects herein.

FIGS. 10A and 10B respectively schematically depict processes for manufacturing a composite nonwoven textile having non-linear entangled seams such as the composite nonwoven textile 100. FIG. 10A depicts a process that uses entanglement needles and may be carried out at any of the entanglement stations 518, 520, or 522. FIG. 10B depicts a process that uses hydroentanglement and may be carried out at, for instance, the entanglement station 612. With respect to both FIG. 10A and FIG. 10B, a coordinate system is provided indicating an x direction, a y direction and a z direction.

Referring to FIG. 10A, at a step 1010, a stacked configuration of the first nonwoven layer 110, the second layer 114, and the fill material 116 is positioned on the surface 514 of the conveyance system 512 such that the second layer 114 is positioned against the surface 514 and the first nonwoven layer 110 is spaced apart from the surface 514 by the fill material 116. The conveyance system 512 and the stacked configuration are in a first stationary phase or position such that the conveyance system 512 is not advancing in the material flow direction 516 (i.e., the positive x-direction). During the first stationary phase, the actuator 528 moves in the direction 530 perpendicular to the plane of conveyance of the surface 514 (i.e., a negative z-direction) such that the entanglement head 532 is lowered causing the entanglement needle 534, and indirectly the entanglement head 532, to engage with the stacked configuration of the first nonwoven layer 110, the second layer 114, and the fill material 116. Alternatively, the actuator 528 may actuate the entanglement head 532 and/or the entanglement needle 534 such that the entanglement needle 534 moves downward to engage with the stacked configuration. The engagement drives fibers from the first nonwoven layer through the fill material 116 and into (or through) the second layer 114 creating a first entanglement area 1012 as shown in step 1014. The first entanglement area 1012 may have an entanglement footprint corresponding to the shape of the structured arrangement of the entanglement needles 534 on the entanglement head 532.

At a step 1016, the entanglement needle 534 disengages from the stacked configuration of the first nonwoven layer 110, the second layer 114, and the fill material 116, and the conveyance system 512 advances the stacked configuration in the material flow direction 516 by a distance 1018. In example aspects, the distance 1018 may be equal to or less than the dimension of the entanglement head 532 in the material flow direction 516. At the step 1016, the carriage 524 moves a first distance in the first direction 610 non-parallel to the material flow direction 516 (i.e., a negative y-direction) where the first distance may be equal to or less than the dimension of the entanglement head 532 in the first direction 610 non-parallel to the material flow direction 516. The movement of the carriage 524 may occur simultaneously with the movement of the conveyance system 512 in the material flow direction 516 or it may occur after the movement of the conveyance system 512 in the material flow direction 516 (i.e., when the conveyance system 512 is in a second stationary phase). Alternatively, or in addition to, the conveyance system 512 may move the first distance in the first direction 610 non-parallel to the material flow direction 516.

At a step 1022, the conveyance system 512 and the stacked configuration are in a second stationary phase or position such that the conveyance system 512 is not advancing in the material flow direction 516. The second stationary phase or position is advanced from the first stationary phase or position in the material flow direction 516. During the second stationary phase, the actuator 528 again moves in the direction 530 perpendicular to the plane of conveyance of the surface 514 such that the entanglement head 532 is lowered causing the entanglement needle 534 to engage with the stacked configuration of the first nonwoven layer 110, the second layer 114, and the fill material 116. Because of the movement of the carriage 524 and/or conveyance system 512, the engagement of the entanglement needle 534 with the stacked configuration occurs at a location offset from the first entanglement area 1012 in the first direction 610 non-parallel to the material flow direction 516. The second engagement again drives fibers from the first nonwoven layer 110 through the fill material 116 and into (or through) the second layer 114 creating a second entanglement area 1026 as shown in step 1024 to create an apparent continuous non-linear entangled seam 1028 in the composite nonwoven textile 100. The second entanglement area 1026 may have an entanglement footprint corresponding to the shape of the structured arrangement of the entanglement needles 534 on the entanglement head 532. As shown at 1024, the second entanglement area 1026 partially overlaps the first entanglement area 1012. This is illustrative, and it is contemplated herein that the second entanglement area 1026 may not partially overlap the first entanglement area 1012.

The process depicted in FIG. 10A may include a plurality of stationary phases or positions that are advanced from each other in the material flow direction during which the entanglement needle 534 engages with the stacked configuration of the first nonwoven layer 110, the second layer 114, and the fill material 116 to form entanglement areas that extend from one another. As well, the process depicted in FIG. 10A may include a plurality of movement phases during which the conveyance system 512 advances the stacked configuration in the material flow direction 516 a distance that is less than or equal to the dimension of the entanglement head 532 in the material flow direction 516 such that the resulting entanglement areas partially overlap or directly extend from one another. Moreover, the carriage 524 and/or the conveyance system 512 may execute multiple movements in the first direction 610 non-parallel to the material flow direction 516 and in the opposite second direction 611 (i.e., the positive y-direction). The distance of movement of the carriage 524 and/or conveyance system 512 in the first direction 610 and the opposite second direction 611 may be less than or equal to the dimension of the entanglement head 532 in the first direction 610 or the opposite second direction 611 such that the resulting entanglement areas partially overlap or directly extend from one another.

The process schematically depicted in FIG. 10B is similar to that shown in FIG. 10A but utilizes hydroentanglement to create non-linear entangled seams. At a step 1050, a stacked configuration of the first nonwoven layer 110, the second layer 114, and the fill material 116 is positioned on the surface 514 of the conveyance system 512 such that the second layer 114 is positioned against the surface 514 and the first nonwoven layer 110 is spaced apart from the surface 514 by the fill material 116. In one example aspect, the conveyance system 512 and the stacked configuration are in a first stationary phase or position such that the conveyance system 512 is not advancing in the material flow direction 516. During the first stationary phase, the actuator 618 actuates the entanglement head 620 to emit one or more pressurized jets of fluid 1052 in a direction toward the surface 514 of the conveyance system 512 to form a first entanglement area 1054 as shown in step 1056. In example aspects, the actuator 618 may not move in a direction perpendicular to the plane of conveyance of the surface 514 during the first stationary phase though it is contemplated herein that the actuator 618 may move in the direction perpendicular to the plane of conveyance of the surface 514 in order to position the jets of fluid 1052 closer to the first nonwoven layer 110. In another example aspect, the conveyance system 512 may continually advance in the material flow direction 516 while the actuator 618 continually actuates the entanglement head 620 to emit the one or more pressurized jets of fluid 1052. The jets of fluid 1052 drive fibers from the first nonwoven layer 110 through the fill material 116 and into (or through) the second layer 114 creating the first entanglement area 1054. The first entanglement area 1054 may have an entanglement footprint corresponding to the shape of the structured arrangement of the orifices on the entanglement head 620.

At a step 1058, the conveyance system 512 advances the stacked configuration in the material flow direction 516 by a distance 1060. In example aspects, the distance 1060 may be equal to or less than the dimension of the entanglement head 620 in the material flow direction 516. At the step 1058, the carriage 616 and/or the conveyance system 512 moves a first distance in the first direction 622 non-parallel to the material flow direction 516 where the first distance may be equal to or less than the dimension of the entanglement head 620 in the direction non-parallel to the material flow direction 516. The movement of the carriage 616 and/or conveyance system 512 may occur simultaneously with the movement of the conveyance system 512 in the material flow direction 516 or it may occur after the movement of the conveyance system 512 in the material flow direction 516 (i.e., when the conveyance system 512 is in a second stationary phase or position that is advanced from the first stationary phase or position in the material flow direction).

At a step 1064, the conveyance system 512 and the stacked configuration are in a second stationary phase or position, the actuator 618 again actuates the entanglement head 620 to emit the jets of fluid 1052 such that the jets of fluid 1052 engage with the stacked configuration of the first nonwoven layer 110, the second layer 114, and the fill material 116. Because of the movement of the carriage 616, the engagement of the jets of fluid 1052 with the stacked configuration occurs at a location offset from the first entanglement area 1054 in the direction 622 non-parallel to the material flow direction 516. The second engagement again drives fibers from the first nonwoven layer 110 through the fill material 116 and into (or through) the second layer 114 creating a second entanglement area 1068 as shown in step 1066 to create an apparent continuous non-linear entangled seam 1070 in the composite nonwoven textile 100 that extends in the material flow direction 516. As shown at 1066, the second entanglement area 1068 partially overlaps the first entanglement area 1054. This is illustrative, and it is contemplated herein that the second entanglement area 1068 may not partially overlap the first entanglement area 1054.

The process depicted in FIG. 10B may include a plurality of stationary phases or positions during which the jets of fluid 1052 engage with the stacked configuration of the first nonwoven layer 110, the second layer 114, and the fill material 116 to form entanglement areas that extend from one another. As well, the process depicted in FIG. 10B may execute a plurality of movement phases during which the conveyance system 512 advances the textile in the material flow direction 516 a distance that is less than or equal to the dimension of the entanglement head 620 in the material flow direction 516 such that the resulting entanglement areas partially overlap or directly extend from one another. Moreover, the carriage 616 and/or the conveyance system 512 may execute multiple movements in the first direction 622 non-parallel to the material flow direction 516 and in the opposite second direction 623. The distance of movement of the carriage 616 and/or conveyance system 512 in the first direction 610 and the opposite second direction 623 may be less than or equal to the dimension of the entanglement head 620 in the first direction 610 or the opposite second direction 623 such that the resulting entanglement areas partially overlap or directly extend from one another.

As described earlier, the entanglement systems described herein, such as the entanglement system 500, may create a composite nonwoven textile, such as the composite nonwoven textile 100 that includes a long repeat of a visual arrangement of non-linear entangled seams or even no repeat of a visual arrangement of non-linear entangled seams. The resulting composite nonwoven textile may be used to create an array of garments having a common finished form but having a varied aesthetic due to different visual arrangements of the non-linear entangled seams on the resulting garments. The array of garments may share features in common, such as the common finished form, color, and the like, such that a consumer would readily recognize the array of garments as coming from a common source (e.g., a common manufacturer). However, the consumer would be able to select a garment from the array of garments that has a desired visual arrangement of the entangled seams. Further, because there is a long repeat or even no repeat of a visual arrangement of non-linear entangled seams, there may be less material waste when forming the array of garments since the pattern pieces do not have to be positioned in such a way to ensure that each garment includes the same visual arrangement of entangled seams at the same location on the garment.

Figure 11:
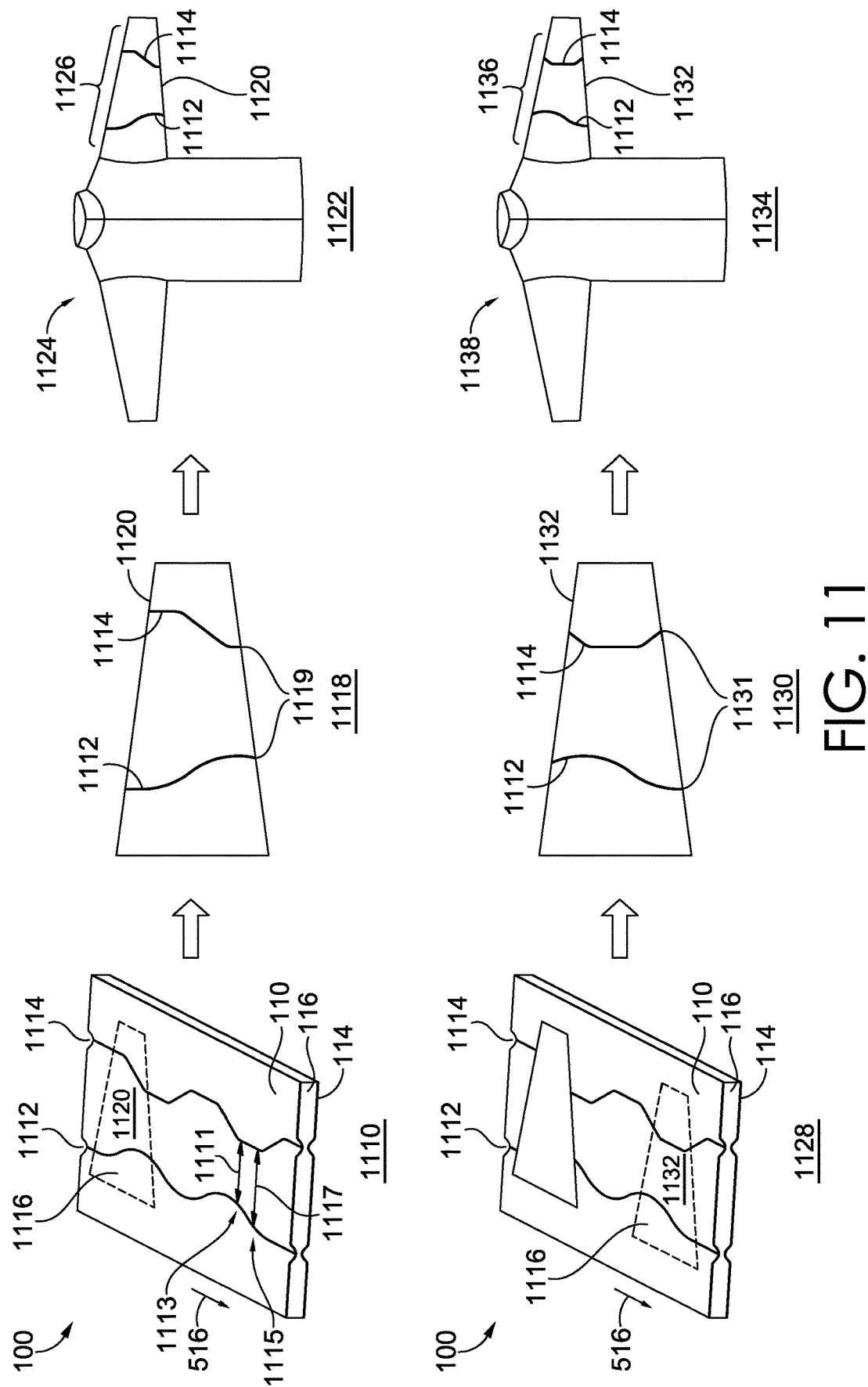
FIG. 11 illustrates an example process for manufacturing an array of garments having a common finished form where the array of garments include different visual arrangements of non-linear entangled seams in accordance with aspects herein.

FIG. 11 schematically illustrates a method of manufacturing an array of garments having a common finished form but different visual arrangements of non-linear entangled seams. At a step 1110, the composite nonwoven textile 100 is provided or obtained. The composite nonwoven textile 100, in this example, includes a first non-linear entangled seam 1112 and a second non-linear entangled seam 1114 both extending in the material flow direction 516 of the composite nonwoven textile 100. In example aspects, a distance between the first non-linear entangled seam 1112 and the second non-linear entangled seam 1114 varies along the material flow direction 516. For example, the first non-linear entangled seam 1112 may be spaced apart from the second non-linear entangled seam by a first distance 1111 at a first location 1113 on the composite nonwoven textile 100. At a second location 1115 on the composite nonwoven textile 100, the first non-linear entangled seam 1112 may be spaced apart from the second non-linear entangled seam 1114 by a second distance 1117, where the second distance 1117 is greater than the first distance 1111.

At the step 1110, a first instance of a pattern 1116 is removed, excised, and/or cut from the composite nonwoven textile 100 where the pattern 1116 corresponds to a left sleeve for an upper-body garment. Stated differently, at the step 1110, a first portion 1120 is removed from the composite nonwoven textile 100, where the first portion 1120 has a shape corresponding to the pattern 1116. The pattern 1116 is illustrative only, and it is contemplated herein that the pattern 1116 may correspond to any portion of an upper-body garment, a lower-body garment, a shoe upper, an article of headwear, and the like.

Step 1118 illustrates the first portion 1120 having the pattern 1116 after it has been removed from the composite nonwoven textile 100. As shown, the first portion 1120 includes the first non-linear entangled seam 1112 and the second non-linear entangled seam 1114 where the first non-linear entangled seam 1112 and the second non-linear entangled seam 1114 are positioned at a first location on the first portion 1120 and/or pattern 1116 as indicated generally by the reference numeral 1119. At a step 1122, the first portion 1120 is incorporated into a first garment 1124. As shown in FIG. 11, the first non-linear entangled seam 1112 and the second non-linear entangled seam 1114 present a first visual arrangement of non-linear entangled seams on the first garment 1124 as generally referenced by the numeral 1126.

At a step 1128, a second instance of the pattern 1116 is removed, excised, and/or cut from the composite nonwoven textile 100. The second instance of the pattern 1116 includes the first non-linear entangled seam 1112 and the second non-linear entangled seam 1114. Stated differently, at the step 1128, a second portion 1132 is removed from the composite nonwoven textile 100 where the second portion 1132 has a shape corresponding to the pattern 1116. Step 1130 illustrates the second portion 1132 having the pattern 1116 after it has been removed from the composite nonwoven textile 100. As shown, the second portion 1132 includes the first non-linear entangled seam 1112 and the second non-linear entangled seam 1114, where the first non-linear entangled seam 1112 and the second non-linear entangled seam 1114 are positioned at a second location on the second portion 1132 and/or pattern 1116 as indicated generally by the reference numeral 1131. At a step 1134, the second portion 1132 is incorporated into a second garment 1138 where the second garment 1138 has the same finished form as the first garment 1124. As shown in FIG. 11, the first non-linear entangled seam 1112 and the second non-linear entangled seam 1114 present a second visual arrangement of non-linear entangled seams on the second garment 1138 as generally referenced by the numeral 1136 where the second visual arrangement of non-linear entangled seams 1136 is a different visual arrangement than the first visual arrangement of non-linear entangled seams 1126.

The process depicted in FIG. 11 may be repeated any number of times along the material flow direction 516 of the composite nonwoven textile 100 to form an array of garments having the first non-linear entangled seam 1112 and the second non-linear entangled seams 1114 positioned at different locations on the pattern 1116 and presenting different visual arrangements of the first and second non-linear entangled seams 1112 and 1114. Although FIG. 11 only depicts the pattern 1116 being applied to the composite nonwoven textile 100, it is contemplated herein that additional pattern pieces may be applied to the composite nonwoven textile 100 such that a resulting garment may be formed from the additional pattern pieces applied to the composite nonwoven textile 100. In this aspects, the visual arrangement of entangled seams at different regions of the garment may differ from each other to produce a varied overall aesthetic. A process similar to that shown in FIG. 11 may be used to form, for example, an array of lower-body garments having a common finished form but different visual arrangements of non-linear entangled seams.

In example aspects, scrap produced by the process depicted in FIG. 11 may be shredded and subsequently formed into, for example one or more of the first nonwoven layer 110, the second layer 114, or the fill material 116. This is possible due to the materials forming the composite nonwoven textile 100 being of the same polymer class in example aspects (e.g., recycled polyester). Further, because the composite nonwoven textile 100 is formed without using disparate materials such as threads, adhesives, and the like, there is no need to remove portions of the scrap material before shredding.

Figure 13:
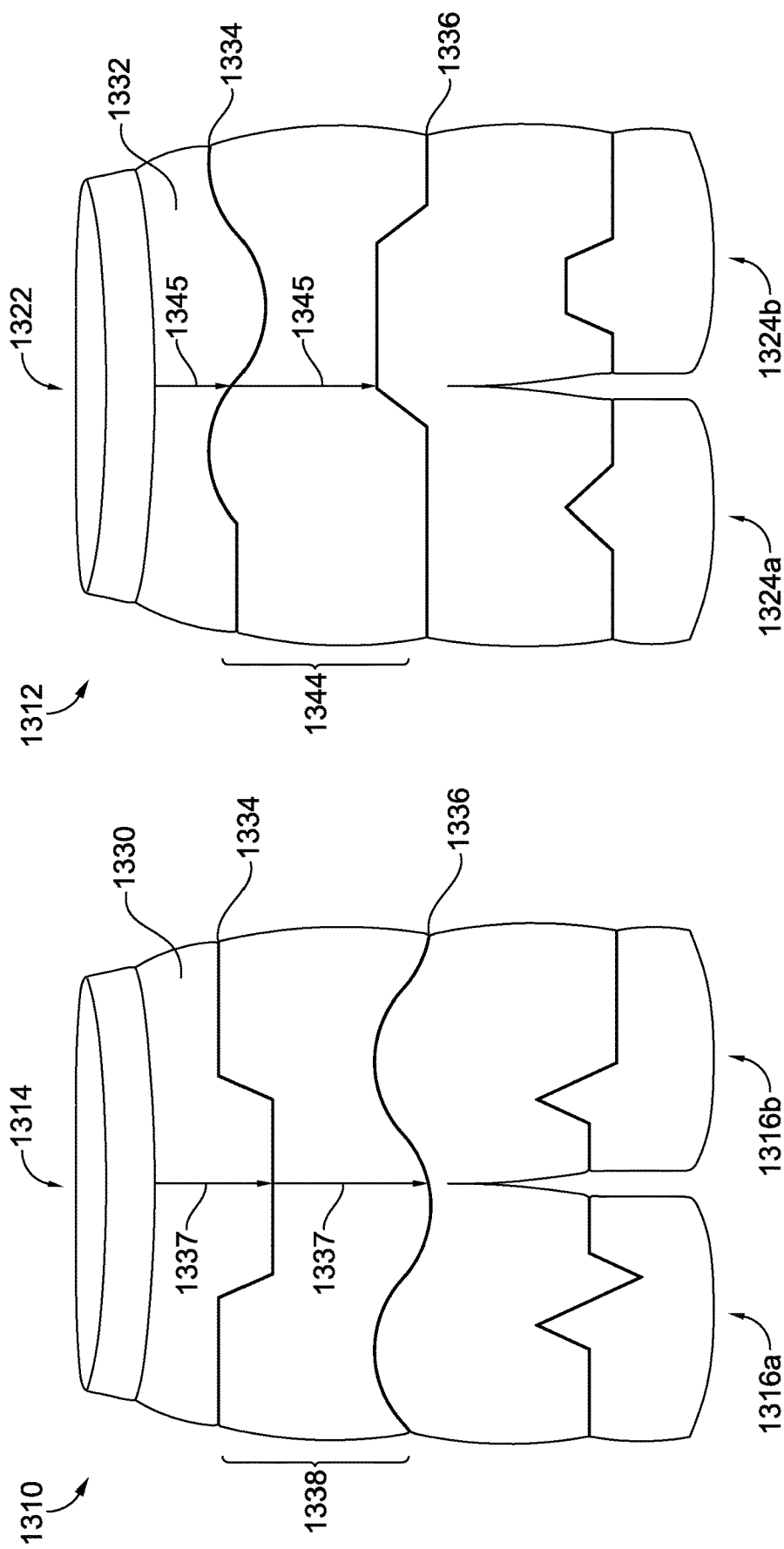
FIG. 13 illustrates an array of lower-body garments formed using the example process of FIG. 11 in accordance with aspects herein.

FIGS. 12 and 13 further illustrate garments produced from the process shown in FIG. 11. FIG. 12 illustrates a front view of an array of upper-body garments in the form of a sleeveless top including a first upper-body garment 1210 and a second upper-body garment 1212 having a common finished form. Although shown as a sleeveless top, it is contemplated herein that the upper-body garments may include other forms such as a vest, a pullover, a hoodie, a jacket, and the like. The first upper-body garment 1210 includes a neck opening 1214, a waist opening 1216, a first sleeve opening 1218, and a second sleeve opening 1220. Similarly, the second upper-body garment 1212 includes a neck opening 1222, a waist opening 1224, a first sleeve opening 1226, and a second sleeve opening 1228. Further, although the non-linear entangled seams are shown extending in a horizontal orientation (in a direction extending, for example, from the first sleeve opening 1218/1226 to the second sleeve opening 1220/1228) it is contemplated herein that the non-linear entangled seams may extend in a vertical direction (in a direction extending, for example, from the neck opening 1214/1222 to the waist opening 1216/1224).

As depicted, at least a front panel 1230 of the first upper-body garment 1210 and a front panel 1232 of the second upper-body garment 1212 may be formed from the same pattern piece applied to the composite nonwoven textile 100. The front panel 1230 of the first upper-body garment 1210 includes a first non-linear entangled seam 1234 and a second non-linear entangled seam 1236 positioned at a first location 1238 on the first upper-body garment 1210. In example aspects, the first location 1238 may correspond to a first distance 1237 as measured at a front vertical midline of the first upper-body garment 1210 for each of the first non-linear entangled seam 1234 and the second non-linear entangled seam 1236 relative to the waist opening 1216 of the first upper-body garment 1210. The first non-linear entangled seam 1234 and the second non-linear entangled seam 1236 present a first visual arrangement of entangled seams on the first upper-body garment 1210.

The front panel 1232 of the second upper-body garment 1212 further includes the first non-linear entangled seam 1234 and the second non-linear entangled seam 1236 positioned at a second location 1244 on the second upper-body garment 1212 where the second location 1244 is different from the first location 1238. For example, the second location 1244 may correspond to a second distance 1245 as measured at a front vertical midline of the second upper-body garment 1212 for each of the first non-linear entangled seam 1234 and the second non-linear entangled seam 1236 relative to the waist opening 1224 of the second upper-body garment 1212 where the second distance 1245 for each of the first non-linear entangled seam 1234 and the second non-linear entangled seam 1236 is different from the first distance 1237. The first non-linear entangled seam 1234 and the second non-linear entangled seam 1236 present a second visual arrangement of entangled seams on the second upper-body garment 1212.

Although not shown, there may be additional upper-body garments included in the array where the additional upper-body garments have a common finished form with the first upper-body garment 1210 and the second upper-body garment 1212. The additional upper-body garments in the array may present a different visual arrangement of the first non-linear entangled seam 1234 and the second non-linear entangled seam 1236. Stated differently, the first non-linear entangled seam 1234 and the second non-linear entangled seam 1236 may be positioned at different locations on the additional garments relative to the pattern piece described above that is used to form the front panel of the additional upper-body garments.

FIG. 13 illustrates a front view of an array of lower-body garments in the form of a short including a first lower-body garment 1310 and a second lower-body garment 1312 having a common finished form. Although shown as a short, it is contemplated herein that the lower-body garments may include other forms such as a pant, a capri, and the like. The first lower-body garment 1310 includes a waist opening 1314, a first leg opening 1316a, and a second leg opening 1316b. Similarly, the second lower-body garment 1312 includes a waist opening 1322, a first leg opening 1324a, and a second leg opening 1324b. Further, although the non-linear entangled seams are shown extending in a horizontal orientation, it is contemplated herein that the non-linear entangled seams may extend in a vertical direction.

As depicted, at least a front panel 1330 of the first lower-body garment 1310 and a front panel 1332 of the second lower-body garment 1312 may be formed from the same pattern piece applied to the composite nonwoven textile 100. The front panel 1330 of the first lower-body garment 1310 includes a first non-linear entangled seam 1334 and a second non-linear entangled seam 1336 positioned at a first location 1338 on the first lower-body garment 1310. In example aspects, the first location 1338 may correspond to a first distance 1337 as measured at a front vertical midline of the first lower-body garment 1310 for each of the first non-linear entangled seam 1334 and the second non-linear entangled seam 1336 relative to the waist opening 1314 of the first lower-body garment 1310. The first non-linear entangled seam 1334 and the second non-linear entangled seam 1336 present a first visual arrangement of entangled seams on the first lower-body garment 1310.

The front panel 1332 of the second lower-body garment 1312 further includes the first non-linear entangled seam 1334 and the second non-linear entangled seam 1336 positioned at a second location 1344 on the second lower-body garment 1312 where the second location 1344 is different from the first location 1338. For example, the second location 1344 may correspond to a second distance 1345 as measured at a front vertical midline of the second lower-body garment 1312 for each of the first non-linear entangled seam 1334 and the second non-linear entangled seam 1336 relative to the waist opening 1322 of the second lower-body garment 1312 where the second distance 1345 for each of the first non-linear entangled seam 1334 and the second non-linear entangled seam 1336 is different from the first distance 1337. The first non-linear entangled seam 1334 and the second non-linear entangled seam 1336 present a second visual arrangement of entangled seams on the second lower-body garment 1312.

Although not shown, there may be additional lower-body garments included in the array where the additional lower-body garments have a common finished form with the first lower-body garment 1310 and the second lower-body garment 1312. The additional lower-body garments in the array may present a different visual arrangement of the first non-linear entangled seam 1334 and the second non-linear entangled seam 1336. Stated differently, the first non-linear entangled seam 1334 and the second non-linear entangled seam 1336 may be positioned at different locations on the additional garments relative to the pattern piece described above that is used to form the front panel of the additional lower-body garments.

Although the garments depicted in the garment arrays of FIGS. 12 and 13 include different visual arrangements of entangled seams, it is contemplated herein that garments in a garment array produced by the systems and methods described herein may include the same visual arrangement of entangled seams. For example, the entanglement system 500 may be configured to generate a short repeat of a visual arrangement of entangled seams such that a composite nonwoven textile may include multiple repeats of the visual arrangement of entangled seams along the material flow direction 516. In this aspect, pattern pieces may be applied to the composite nonwoven textile to form garments having the same visual arrangement of entangled seams.

Figure 14:
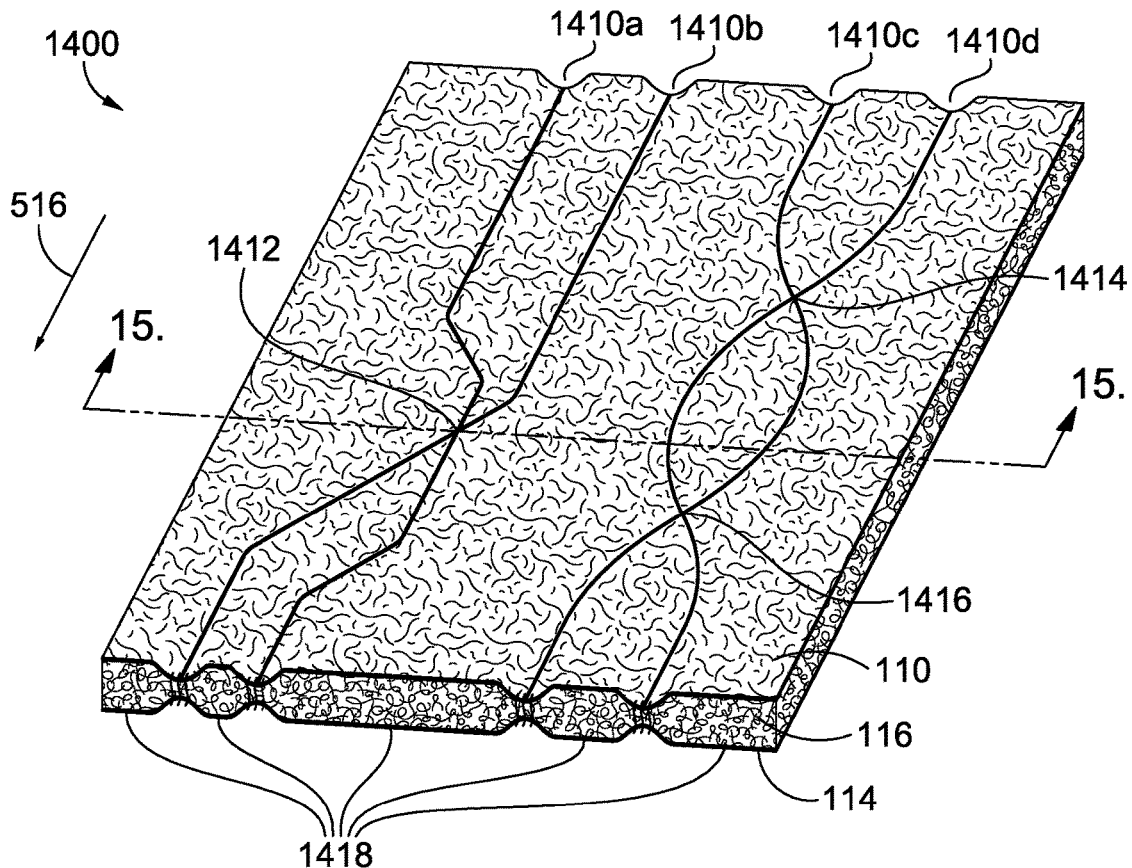
FIG. 14 illustrates a first surface of an example composite nonwoven textile having non-linear entangled seams that intersect each other in accordance with aspects herein.

FIG. 14 depicts a second example composite nonwoven textile 1400 formed from, for example, the first nonwoven layer 110, the second layer 114, and the fill material 116. The composite nonwoven textile 1400 may be formed according to the methods and systems described herein including the entanglement system 500. The composite nonwoven textile 1400 includes non-linear entangled seams 1410a, 1410b, 1410c, and 1410d extending in the material flow direction 516. As shown, the non-linear entangled seams 1410a and 1410b intersect or cross-over each other at intersection point 1412, and the non-linear entangled seams 1410c and 1410d intersect or cross-over each other at intersection points 1414 and 1416. The intersection points 1412, 1414, and 1416 represent areas where an entanglement head engages with the composite nonwoven textile 1400 at least two times. As such, the intersection points 1412, 1414, and 1416 have a greater stitch density than remaining portions of the non-linear entangled seams 1410a, 1410b, 1410c, and 1410d. The greater stitch density at the intersection points 1412, 1414, and 1416 causes a further reduced thickness compared to remaining portions of the non-linear entangled seams 1410a, 1410b, 1410c, and 1410d and compared to regions 1418 that extend between the non-linear entangled seams 1410a, 1410b, 1410c, and 1410d.

Figure 15:
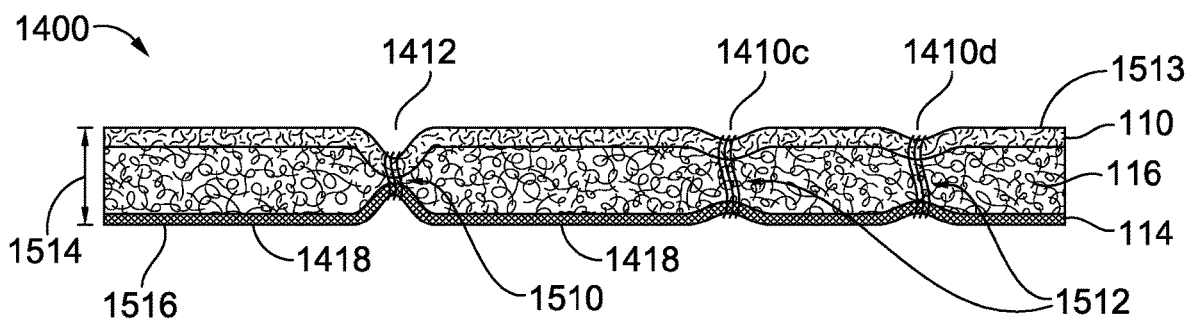
FIG. 15 illustrates a cross section taken at cut line 15-15 of FIG. 14 in accordance with aspects herein.

This is shown in FIG. 15 which is a cross-section of the composite nonwoven textile 1400 taken at cut line 15-15. The regions 1418 have a thickness 1514 as measured from a first surface 1513 formed by the first nonwoven layer 110 to an opposite second surface 1516 formed by the second layer 114. The intersection point 1412 has a thickness 1510 as measured from the first surface 1513 to the opposite second surface 1516, and the non-linear entangled seams 1410c and 1410d have a thickness 1512 as measured from the first surface 1513 to the opposite second surface 1516. In example aspects, the thickness 1514 is greater than the thickness 1512, which is greater than the thickness 1510. The ability to create a varied thickness of the composite nonwoven textile 1400 in a direction non-parallel to the material flow direction may be used to engineer in high-insulation zones and low-insulation zones where needed on a garment incorporating the composite nonwoven textile 1400. The insulation zones may have an increased thickness (e.g., more loft) and may correspond to the regions 1418. The low-insulation zones may correspond to areas that include multiple intersection points such as the intersection points 1412, 1414, and 1416.

Figure 16:
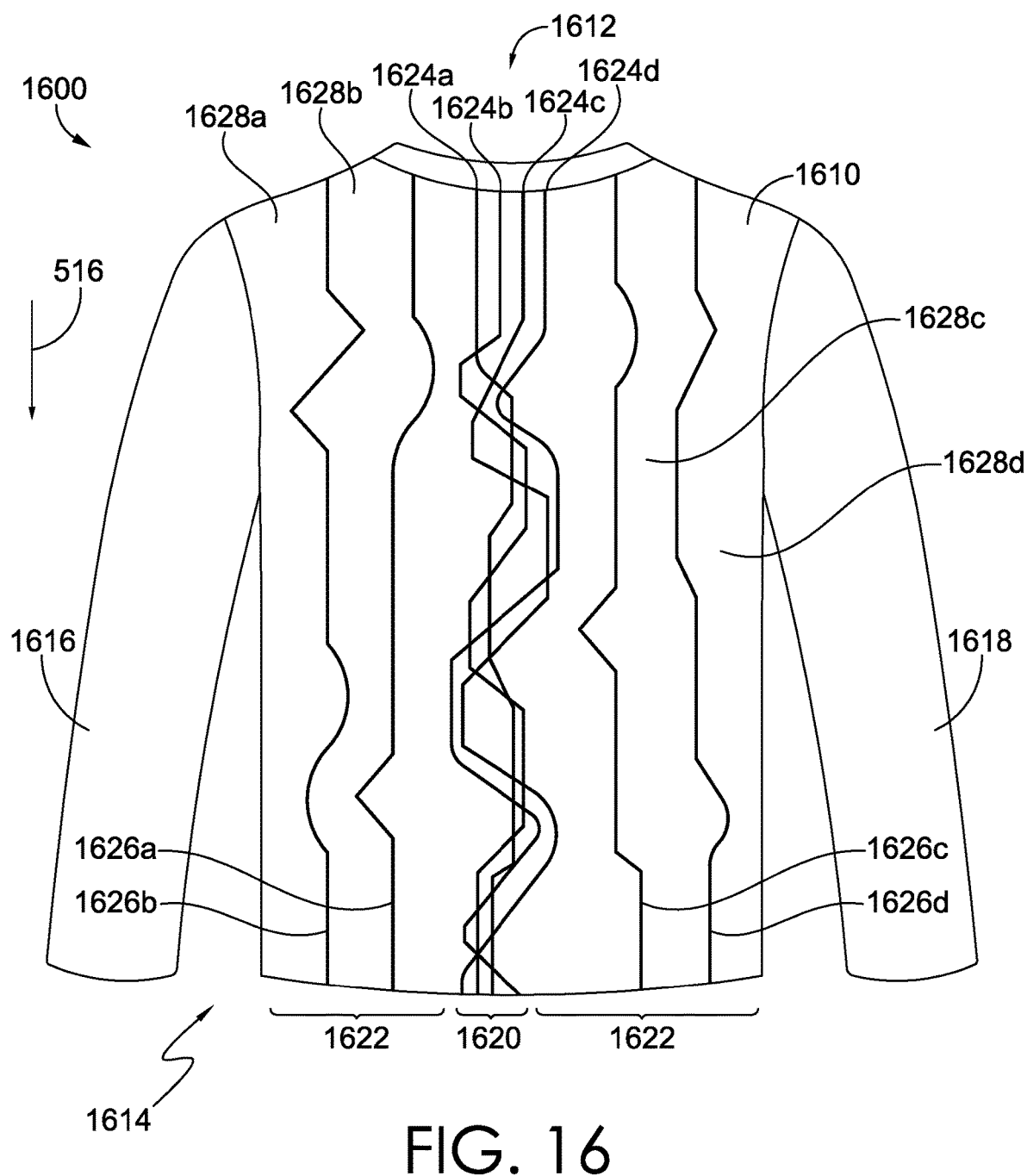
FIG. 16 illustrates an example upper-body garment having zoned insulation features where the example upper-body garment is formed using the composite nonwoven textile of FIG. 14 in accordance with aspects herein.

FIG. 16 depicts a back view of an example upper-body garment 1600 having a torso portion 1610 where the torso portion 1610 includes a neck opening 1612 and a waist opening 1614. The upper-body garment 1600 further includes an optional first sleeve 1616 and an optional second sleeve 1618. Although shown as a top having long sleeves, it is contemplated herein that the upper-body garment 1600 may be in the form of a vest, a pullover, a hoodie, a jacket, and the like.

The upper-body garment includes a low-insulation zone 1620 located at a central back region of the torso portion 1610 and high-insulation zones 1622 located on either side of the low-insulation zone 1620. The location of the low-insulation zone 1620 and the high-insulation zones 1622 may be based on, for example, heat maps of the human body. For instance, these maps may indicate that the central back torso of a human generates a high amount of heat and, as such, may require less insulation than other areas of the torso. The low-insulation zone 1620 includes a plurality of non-linear entangled seams 1624*a*, 1624*b*, 1624*c*, and 1624*d* extending in the material flow direction 516. As depicted, the non-linear entangled seams 1624*a*, 1624*b*, 1624*c*, and 1624*d* are generally spaced close together and include multiple intersection points as they extend from the neck opening 1612 to the waist opening 1614 of the upper-body garment 1600. This results in an overall increased stitch density in the low-insulation zone 1620 and an overall reduced thickness compared to other portions of the upper-body garment 1600. By contrast, the high-insulation zones 1622 include non-linear entangled seams 1626*a*, 1626*b*, 1626*c*, and 1626*d*. The non-linear entangled seams 1626*a*, 1626*b*, 1626*c*, and 1626*d* are generally spaced further apart compared to the non-linear entangled seams 1624*a*, 1624*b*, 1624*c*, and 1624*d*, and the non-linear entangled seams 1626*a*, 1626*b*, 1626*c*, and 1626*d* do not intersect each other. As such, the high-insulation zones 1622 have an overall reduced stitch density and an overall increased thickness than the low-insulation zone 1620. Stated differently, the high-insulation zones 1622 may include a greater surface area occupied by regions 1628*a*, 1628*b*, 1628*c*, and 1628*d* where the first nonwoven layer 110, the second layer 114, and the fill material 116 are substantially unentangled as compared to the low-insulation zone 1620. The greater thickness and loft of the regions 1628*a*, 1628*b*, 1628*c*, and 1628*d* help to trap and store heat.

The visual arrangement of the non-linear entangled seams in FIG. 16 is illustrative only, and it is contemplated herein that other visual arrangements may be formed by the non-linear entangled seams. Moreover, although the entangled seams are shown extending vertically (e.g., from a neck opening to a waist opening, the entangled seams may be oriented horizontally on the garment). In addition, the upper-body garment 1600 may include non-linear entangled seams at different locations on the upper-body garment than those shown. The depiction of the upper-body garment 1600 in FIG. 16 is meant to convey the concept that parameters associated with the non-linear entangled seams may be adjusted to achieve desired properties including insulation properties. The parameters may include, for example, a spacing between adjacent non-linear entangled seams (e.g., greater spacing results in the regions 1628*a*, 1628*b*, 1628*c*, and 1628*d* occupying an overall greater surface area of the upper-body garment 1600), the number of intersection points between the non-linear entangled seams (e.g., more intersection points results in an increased stitch density and a reduced thickness), the width of the individual non-linear entangled seams (e.g., a greater width results in a reduced thickness compared to non-linear entangled seams having a smaller width), and the like.

Figure 17:
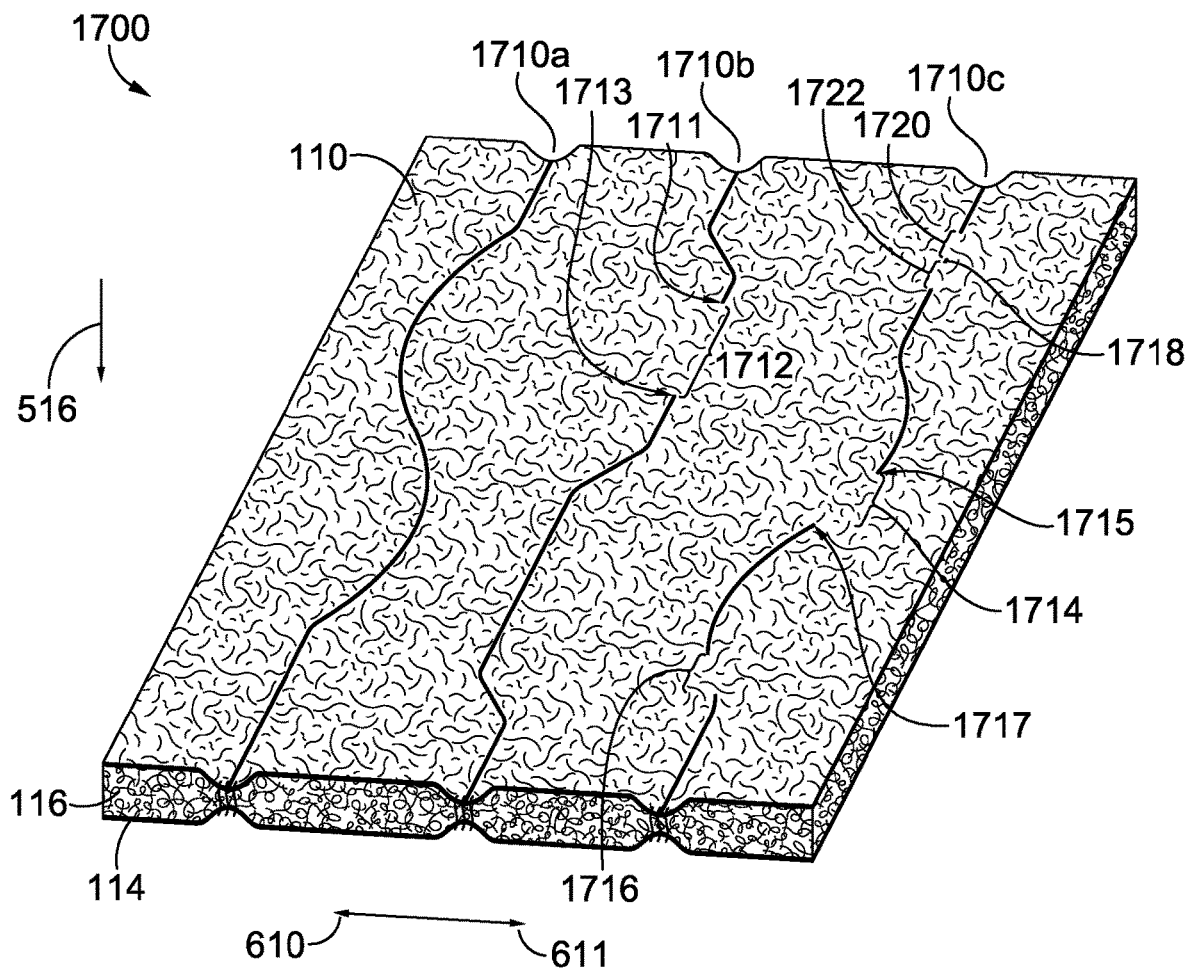
FIG. 17 illustrates an example composite nonwoven textile having discontinuous non-linear entangled seams in accordance with aspects herein.

FIG. 17 depicts an example composite nonwoven textile 1700 formed from the first nonwoven layer 110, the second layer 114, and the fill material 116. In example aspects, the composite nonwoven textile 1700 includes non-linear entangled seams 1710*a*, 1710*b*, and 1710*c*. The non-linear entangled seam 1710*a* is similar to other non-linear entangled seams discussed herein with respect to, for instance, the composite nonwoven textile 100 and the composite nonwoven textile 1400. The non-linear entangled seams 1710*b* and 1710*c* include discontinuous non-linear entangled seams. For example, the non-linear entangled seam 1710*b* includes a discontinuous segment 1712 in which no entangled seam is formed. The non-linear entangled seam 1710*c* includes multiple discontinuous segments such as a discontinuous segment 1714 and a discontinuous segment 1716. Further, the non-linear entangled seam 1710*c* includes an entangled seam portion 1718 that is in the form of a very short segment or even a point of entanglement that is spaced apart from remaining portions of the non-linear entangled seam 1710*c* by a discontinuous segment 1720 and a discontinuous segment 1722.

The discontinuous segments 1712, 1714, 1716, 1720, and 1722 may be formed using the entanglement system 500 and the methods described herein. For example, with respect to the discontinuous segment 1712, it may be formed by not actuating the entanglement head 532 forming the non-linear entangled seam 1710*b* during one or more stationary phases such that the entanglement needle(s) 534 and/or orifice(s) associated with the entanglement head 532 does not come into contact with the composite nonwoven textile 1700. The length of the discontinuous segments 1712, 1714, 1716, 1720, and 1722 may be adjusted as desired by varying the number of stationary phases in which the entanglement head 532 is not actuated.

In example aspects, when the entanglement head 532 is subsequently actuated and as shown with respect to the non-linear entangled seam 1710*b*, the carriage 524 and/or conveyance system 512 may be positioned to align in the material flow direction 516 with a last entanglement area 1711 formed before the discontinuous segment 1712 is generated such that a next entanglement area 1713 is aligned in the material flow direction 516 with the last entanglement area 1711. Alternatively, and as shown with respect to the discontinuous segment 1714 of the non-linear entangled seam 1710, when the entanglement head 532 is actuated after the discontinuous segment 1714 is formed, the carriage 524 and/or conveyance system 512 may be positioned to be offset in the first direction 610 from a last entanglement area 1715 formed before the discontinuous segment 1714 is generated such that a next entanglement area 1717 is offset in the first direction 610 from the last entanglement area 1715. It is also contemplated herein that the carriage 524 and/or conveyance system 512 may be positioned to be offset in the second direction 611 such that a subsequent entanglement area is offset in the second direction 611 from a previous entanglement area as shown with respect to the discontinuous segment 1716.

With respect to the entangled seam portion 1718, in example aspects, the entangled seam portion 1718 may be formed by actuating the entanglement head 532 at least one time after the discontinuous segment 1720 is generated and before the discontinuous segment 1722 is generated. The length of the entangled seam portion 1718 may be adjusted based on the number of times the entanglement head 532 is actuated after the discontinuous segment 1720 is formed and before the discontinuous segment 1722 is formed. For example, actuating the entanglement head 532 one or two times may produce a point of entanglement while actuating the entanglement head 532 between three to ten times may produce a short segment of entanglement.

Any combination of continuous non-linear entangled seams and discontinuous non-linear entangled seams are contemplated herein. In example aspects, discontinuous segments may be created when increased loft and thickness of the composite nonwoven textile 1700 is desired. For example, when the composite nonwoven textile 1700 is incorporated into a garment, discontinuous non-linear entangled seams may be positioned in areas of the garment for which a higher amount of insulation is desired. Moreover, the length of the discontinuous segments may be adjusted according to insulation needs (e.g., longer discontinuous segments equals more loft and more insulation and shorter discontinuous segments equals less loft and less insulation).

Figure 18:
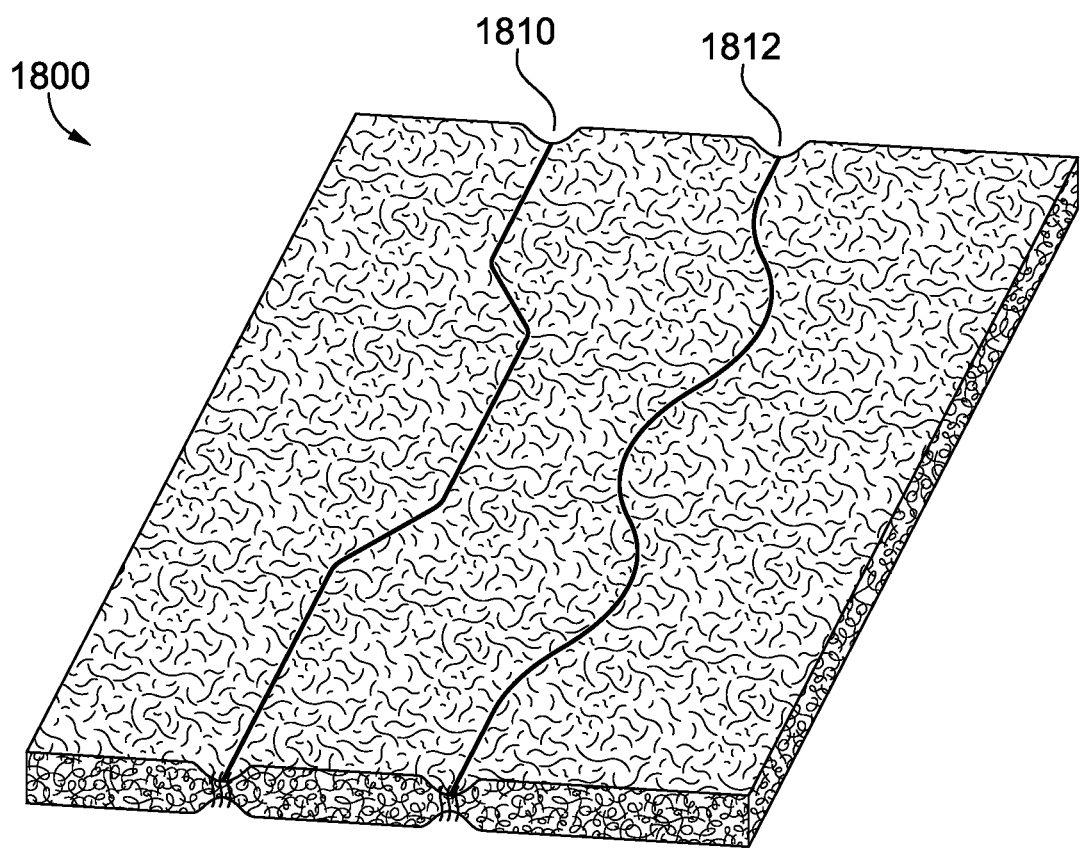
FIG. 18 illustrates an example single layer nonwoven textile having non-linear entangled seams in accordance with aspects herein.
Figure 19:
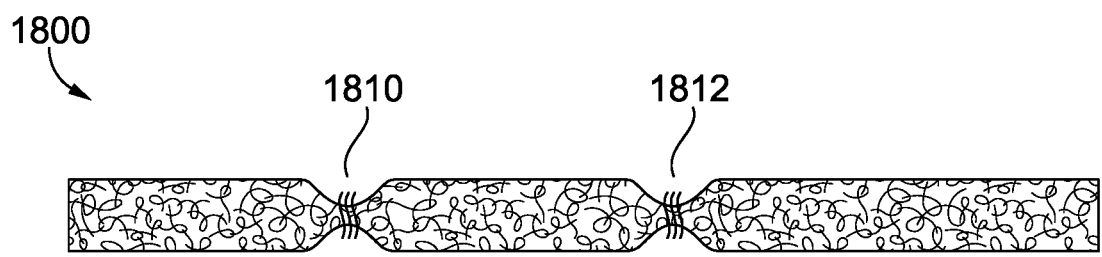
FIG. 19 illustrates a cross-section of the example single layer nonwoven textile of FIG. 18 in accordance with aspects herein.

Aspects herein contemplate that instead of having a stacked configuration of discrete layers or materials that are joined or secured together at seam areas using an entanglement process, entangled seams may be used on a single layer of a material that includes nonwoven fibers. The term "single layer" is meant to convey a cohesive structure as opposed to separate layers that are not joined together prior to the creation of the entangled seams as described herein. For example, FIG. 18 depicts an example nonwoven textile 1800 having entangled seams 1810 and 1812, and FIG. 19 depicts a cross-section of the nonwoven textile 1800. The nonwoven textile 1800 may include a single fiber layer comprising entangled fibers; two or more fiber layers having the same or disparate properties (e.g., different staple length fibers, different denier fibers, different colored fibers, different fiber types, different fiber coatings, and the like) that are joined together through an entanglement process (e.g., needlepunching or hydroentanglement) or other processes such as bonding, adhesives, stitching, and the like; or one or more fiber layers having the same or disparate properties that are joined together with films or structured textiles (e.g., knit, woven, or braided textiles) through an entanglement process or other processes such as bonding, adhesives, stitching, and the like.

The non-linear entangled seams 1810 and 1812 may be formed through the entanglement processes described above, and the seams 1810 and 1812 may be used to create areas of reduced thickness and/or to create a visual arrangement of entangled seams. In example aspects, the nonwoven textile 1800 may be combined with additional single layers of material. For example, the nonwoven textile 1800 may be positioned adjacent to a structured textile and joined thereto through entanglement, stitching, bonding, adhesives, and the like. One or more additional materials such as a fill material may be positioned between the nonwoven textile 1800 and the structured textile. In another example, the nonwoven textile 1800 may be positioned adjacent to another single layer nonwoven textile having entangled seams and secured thereto through entanglements, stitching, bonding, adhesives, and the like. One or more additional materials such as a fill material may be positioned between the nonwoven textile 1800 and the additional single layer nonwoven textile. Any and all aspects, and any variation thereof, are contemplated as being within the scope herein. The nonwoven textile 1800 may be formed into different articles of apparel as described herein such as upper-body garment, lower-body garments, articles of footwear (e.g., uppers), and the like. The articles of apparel of a same type may have different visual arrangements of entangled seams as described herein.

The following clauses represent example aspects of concepts contemplated herein. Any one of the following clauses may be combined in a multiple dependent manner to depend from one or more other clauses. Further, any combination of dependent clauses (clauses that explicitly depend from a previous clause) may be combined while staying within the scope of aspects contemplated herein. The following clauses are examples and are not limiting.

Clause 1. A method of manufacturing a composite nonwoven textile comprising a first nonwoven layer, a second layer, and a fill material positioned between the first nonwoven layer and the second layer, the method comprising: while the composite nonwoven textile is in a first position on an entanglement machine, causing an entanglement head to engage the composite nonwoven textile to form a first entanglement area on the composite nonwoven textile; advancing the composite nonwoven textile in a material flow direction through the entanglement machine; moving one or more of the entanglement head and the composite nonwoven textile in a first direction non-parallel to the material flow direction; and while the composite nonwoven textile is in a second position advanced from the first position in the material flow direction, causing the entanglement head to engage the composite nonwoven textile to form a second entanglement area on the composite nonwoven textile, the second entanglement area extending from the first entanglement area to form a non-linear entangled seam.

Clause 2. The method of manufacturing the composite nonwoven textile according to clause 1, wherein at each of the first entanglement area and the second entanglement area, fibers from the first nonwoven layer extend through the fill material and into the second layer.

Clause 3. The method of manufacturing the composite nonwoven textile according to any of clauses 1 through 2, wherein the first entanglement area partially overlaps the second entanglement area.

Clause 4. The method of manufacturing the composite nonwoven textile according to any of clauses 1 through 3, wherein a stitch density at the overlap area between the first entanglement area and the second entanglement area is greater than a stitch density at remaining portions of the first entanglement area and the second entanglement area.

Clause 5. The method of manufacturing the composite nonwoven textile according to any of clauses 1 through 4, wherein when the composite nonwoven textile is in the first position, the entanglement head moves in a direction perpendicular to a surface plane of the composite nonwoven textile.

Clause 6. The method of manufacturing the composite nonwoven textile according to any of clauses 1 through 5, further comprising: subsequent to forming the second entanglement area, advancing the composite nonwoven textile in the material flow direction; moving one or more of the entanglement head or the composite nonwoven textile in a second direction non-parallel to the material flow direction; and while the composite nonwoven textile is in a third position advanced from the second position in the material flow direction, causing the entanglement head to engage the composite nonwoven textile to form a third entanglement area on the composite nonwoven textile, the third entanglement area extending from the second entanglement area to form the non-linear entangled seam.

Clause 7. The method of manufacturing the composite nonwoven textile according to clause 6, wherein the third entanglement area partially overlaps the second entanglement area.

Clause 8. The method of manufacturing the composite nonwoven textile according to clause 6, wherein the third entanglement area is positioned adjacent to the second entanglement area.

Clause 9. The method of manufacturing the composite nonwoven textile according to any of clauses 6 through 8, wherein the second direction is opposite the first direction.

Clause 10. A garment comprising: a first nonwoven layer having a material flow direction; a second layer; a fill material positioned between the first nonwoven layer and the second layer; at least one region of the garment where the first nonwoven layer, the second layer, and the fill material are substantially unentangled; and at least one non-linear entangled seam extending along the material flow direction, the at least one non-linear entangled seam comprising one or more entanglement areas extending from each other to form the at least one non-linear entangled seam, wherein the one or more entanglement areas comprise fibers from the first nonwoven layer that extend through the fill material and into the second layer.

Clause 11. The garment according to clause 10, wherein the second layer is a nonwoven material.

Clause 12. The garment according to any of clauses 10 through 11, wherein the one or more entanglement areas comprise discrete areas.

Clause 13. The garment according to any of clauses 10 through 12, wherein a thickness of the at least one region of the garment where the first nonwoven layer, the second layer, and the fill material are substantially unentangled is from about 7 mm to about 15 mm.

Clause 14. The garment according to any of clauses 10 through 13, wherein a thickness of the at least one non-linear entangled seam is from about 5% to about 30% of the thickness of the at least one region of the garment where the first nonwoven layer, the second layer, and the fill material are substantially unentangled.

Clause 15. The garment according to any of clauses 10 through 14, wherein the fill material is one or more of a sheet of synthetic fibers, loose synthetic fibers, and down.

Clause 16. The garment according to clause 10 and clauses 12 through 15, wherein the second layer is a woven material.

Clause 17. The garment according to clauses 10 through 11 and clauses 13 through 15, wherein the one or more entanglement areas partially overlap each other.

Clause 18. The garment according to clauses 10 through 17, further comprising a plurality of additional non-linear entangled seams, wherein the plurality of additional non-linear entangled seams forms a non-repeating visual arrangement of entangled seams.

Clause 19. A composite nonwoven textile comprising: a first nonwoven layer having a material flow direction; a second layer; a fill material positioned between the first nonwoven layer and the second layer; at least one region of the composite nonwoven textile where the first nonwoven layer, the second layer, and the fill material are substantially unentangled; and at least one non-linear entangled seam extending along the material flow direction, the at least one non-linear entangled seam comprising one or more entanglement areas extending from each other to form the at least one non-linear entangled seam, wherein the one or more entanglement areas comprise fibers from the first nonwoven layer that extend through the fill material and into the second layer.

Clause 20. The composite nonwoven textile according to clause 19, wherein the second layer is a nonwoven material.

Clause 21. The composite nonwoven textile according to clauses 19 through 20, wherein the one or more entanglement areas comprise discrete entanglement areas.

Clause 22. The composite nonwoven textile according to clauses 19 through 21, wherein a thickness of the at least one region of the composite nonwoven textile where the first nonwoven layer, the second layer, and the fill material are substantially unentangled is from about 7 mm to about 15 mm.

Clause 23. The composite nonwoven textile according to any of clauses 19 through 22, wherein a thickness of the at least one non-linear entangled seam is from about 5% to about 30% of the thickness of the at least one region of the composite nonwoven textile where the first nonwoven layer, the second layer, and the fill material are substantially unentangled.

Clause 24. The composite nonwoven textile according to any of clauses 19 through 23, wherein the fill material is one or more of a sheet of synthetic fibers, loose synthetic fibers, and down.

Clause 25. The composite nonwoven textile according to any of clause 19 and clauses 21 through 24, wherein the second layer is a woven material.

Clause 26. The composite nonwoven textile according to any of clauses 19 through 20 and clauses 22 through 25, wherein the one or more entanglement areas partially overlap each other.

Clause 27. The composite nonwoven textile according to any of clauses 19 through 26, further comprising a plurality of additional non-linear entangled seams, wherein the plurality of additional non-linear entangled seams forms a non-repeating visual arrangement of entangled seams.

Clause 28. An entanglement system for forming at least one non-linear entangled seam on a composite nonwoven textile, the entanglement system comprising: a first entanglement station comprising: a conveyance system having a surface adapted to intermittently advance the composite nonwoven textile in a material flow direction; a first actuator; a first entanglement head coupled to the first actuator, the first actuator adapted to cause the first entanglement head to move in a direction perpendicular to a plane of conveyance of the conveyance system; and a first carriage coupled to the first entanglement head, the first carriage adapted to move in a first direction non-parallel to the material flow direction.

Clause 29. The entanglement system according to clause 28, wherein the first direction is perpendicular to the material flow direction.

Clause 30. The entanglement system according to any of clauses 28 through 29, wherein the first carriage is further adapted to move in a second direction non-parallel to the material flow direction, the second direction opposite the first direction.

Clause 31. The entanglement system according to clause 30, wherein the second direction is perpendicular to the material flow direction.

Clause 32. The entanglement system according to any of clauses 28 through 31, wherein the first entanglement head has a first dimension in the material flow direction.

Clause 33. The entanglement system according to any of clauses 28 through 32, wherein a distance of advancement of the conveyance system is less than or equal to the first dimension of the first entanglement head.

Clause 34. The entanglement system according to any of clauses 28 through 33, wherein the first actuator is adapted to move in the direction perpendicular to the plane of conveyance when the conveyance system is stationary.

Clause 35. The entanglement system according to any of clauses 28 through 34, wherein the first carriage is indirectly coupled to the first entanglement head by way of the first actuator.

Clause 36. The entanglement system according to any of clauses 28 through 35, further comprising: a second entanglement station comprising: the conveyance system having the surface adapted to intermittently advance the composite nonwoven textile in the material flow direction; a second actuator; a second entanglement head coupled to the second actuator, the second actuator adapted to cause the second entanglement head to move in a direction perpendicular to the plane of conveyance of the conveyance system; and a second carriage coupled to the second entanglement head, the second carriage adapted to move in the first direction non-parallel to the material flow direction.

Clause 37. The entanglement system according to clause 36, wherein the first entanglement head is positioned a first distance inward from a first edge of the surface of the conveyance system and the second entanglement head is positioned a second distance inward from the first edge of the surface of the conveyance system, the second distance different from the first distance.

Clause 38. The entanglement system according to any of clauses 36 through 37, wherein the second entanglement station is positioned at a location subsequent to the first entanglement station in the material flow direction.

Clause 39. The entanglement system according to any of clauses 28 through 38, wherein the first entanglement head includes a plurality of entanglement needles.

Clause 40. A method of manufacturing an array of garments having a common finished form, the method comprising: obtaining a composite nonwoven textile comprising a first nonwoven layer, a second layer, and a fill material positioned between the first nonwoven layer and the second layer, the composite nonwoven textile including at least a first non-linear entangled seam and a second non-linear entangled seam, the first non-linear entangled seam and the second non-linear entangled seam each comprising entanglement areas extending from each other to form an apparent continuous non-linear entangled seam, wherein the entanglement areas comprise fibers from the first nonwoven layer extending through the fill material and into the second layer; removing a first instance of a pattern piece from the composite nonwoven textile, the first instance of the pattern piece having the first non-linear entangled seam and the second non-linear entangled seam; using the first instance of the pattern piece to form a first garment, the first non-linear entangled seam and the second non-linear entangled seam positioned at a first location of the pattern piece; removing a second instance of the pattern piece from the composite nonwoven textile, the second instance of the pattern piece having the first non-linear entangled seam and the second non-linear entangled seam; and using the second instance of the pattern piece to form a second garment, the first non-linear entangled seam and the second non-linear entangled seam positioned at a second location of the pattern piece, the second location different from the first location.

Clause 41. The method of manufacturing the array of garments according to clause 40, wherein the first non-linear entangled seam and the second non-linear entangled seam each extend in a material flow direction.

Clause 42. The method of manufacturing the array of garments according to any of clauses 40 through 41, wherein the entanglement areas partially overlap each other.

Clause 43. The method of manufacturing the array of garments according to any of clauses 40 through 42, further comprising: removing a third instance of the pattern piece from the composite nonwoven textile, the third instance of the pattern piece having the first non-linear entangled seam and the second non-linear entangled seam; and using the third instance of the pattern piece to form a third garment, the first non-linear entangled seam and the second non-linear entangled seam positioned at a third location of the pattern piece, the third location different from one or more of the first location and the second location.

Clause 44. The method of manufacturing the array of garments according to any of clauses 41 through 43, wherein the array of garments includes upper-body garments.

Clause 45. The method of manufacturing the array of garments according to any of clauses 41 through 43, wherein the array of garments includes lower-body garments.

Clause 46. An array of garments having a common finished form, the array of garments formed from a composite nonwoven textile comprising a first nonwoven layer, a second layer, and a fill material positioned between the first nonwoven layer and the second layer, the composite nonwoven textile including at least a first non-linear entangled seam and a second non-linear entangled seam, the first non-linear entangled seam and the second non-linear entangled seam each comprising entanglement areas extending from each other to form the respective first non-linear entangled seam and the second non-linear entangled seam, wherein the entanglement areas comprise fibers from the first nonwoven layer extending through the fill material and into the second layer, the array of garments comprising: a first garment formed from a first instance of a pattern piece taken from the composite nonwoven textile, the first non-linear entangled seam and the second non-linear entangled seam positioned at a first location on the first garment; and a second garment formed from a second instance of the pattern piece taken from the composite nonwoven textile, the first non-linear entangled seam and the second non-linear entangled seam positioned at a second location on the second garment, the second location different from the first location relative to the pattern piece.

Clause 47. The array of garments according to clause 46, wherein the first non-linear entangled seam and the second non-linear entangled seam each extend in a material flow direction.

Clause 48. The array of garments according to any of clauses 46 through 47, wherein the entanglement areas partially overlap each other.

Clause 49. The array of garments according to any of clauses 46 through 48, further comprising a third garment formed from a third instance of the pattern piece taken from the composite nonwoven textile, the first non-linear entangled seam and the second non-linear entangled seam positioned at a third location on the third garment, the third location different from one or more of the first location and the second location relative to the pattern piece.

Clause 50. The array of garments according to any of clauses 46 through 49, wherein the array of garments includes upper-body garments.

Clause 51. The array of garments according to any of clauses 46 through 49, wherein the array of garments includes lower-body garments.

Clause 52. A method of manufacturing an array of garments having a common finished form, the method comprising: obtaining a composite nonwoven textile comprising a first nonwoven layer, a second layer, and a fill material positioned between the first nonwoven layer and the second layer, the composite nonwoven textile including at least a first non-linear entangled seam and a second non-linear entangled seam, the first non-linear entangled seam and the second non-linear entangled seam each comprising entanglement areas extending from each other to form an apparent continuous non-linear entangled seam, wherein the entanglement areas comprise fibers from the first nonwoven layer extending through the fill material and into the second layer; removing a first portion having a first pattern from the composite nonwoven textile, the first portion having the first non-linear entangled seam and the second non-linear entangled seam; using the first portion to form a first garment, the first non-linear entangled seam and the second non-linear entangled seam positioned at a first location on the first portion; removing a second portion having the first pattern from the composite nonwoven textile, the second portion having the first non-linear entangled seam and the second non-linear entangled seam; and using the second portion to form a second garment, the first non-linear entangled seam and the second non-linear entangled seam positioned at a second location on the second portion, the second location different from the first location.

Clause 53. The method of manufacturing the array of garments according to clause 52, wherein the first non-linear entangled seam and the second non-linear entangled seam each extend in a material flow direction.

Clause 54. The method of manufacturing the array of garments according to clause 53, wherein a distance between the first non-linear entangled seam and the second non-linear entangled seam varies along the material flow direction, wherein the distance between the first non-linear entangled seam and the second non-linear entangled seam is measured in a direction non-parallel to the material flow direction.

Clause 55. The method of manufacturing the array of garments according to any of clauses 52 through 54, wherein the first non-linear entangled seam and the second non-linear entangled seam include different visual arrangements of entangled seams.

Clause 56. The method of manufacturing the array of garments according to any of clauses 52 through 55, wherein the entanglement areas partially overlap each other.

Clause 57. The method of manufacturing the array of garments according to any of clauses 52 through 56, wherein the array of garments include upper-body garments.

Clause 58. The method of manufacturing the array of garments according to any of clauses 52 through 56, wherein the array of garments include lower-body garments.

Clause 59. An array of garments having a common finished form, the array of garments formed from a composite nonwoven textile comprising a first nonwoven layer, a second layer, and a fill material positioned between the first nonwoven layer and the second layer, the composite nonwoven textile including at least a first non-linear entangled seam and a second non-linear entangled seam, the first non-linear entangled seam and the second non-linear entangled seam each comprising entanglement areas extending from each other to form the respective first non-linear entangled seam and the second non-linear entangled seam, wherein the entanglement areas comprise fibers from the first nonwoven layer extending through the fill material and into the second layer, the array of garments comprising: a first garment formed from a first portion of the composite nonwoven textile having a first pattern, the first non-linear entangled seam and the second non-linear entangled seam positioned at a first location on the first portion of the first garment; and a second garment formed from a second portion of the composite nonwoven textile having the first pattern, the first non-linear entangled seam and the second non-linear entangled seam positioned at a second location on the second portion of the second garment, the second location different from the first location.

Clause 60. The array of garments according to clause 59, wherein the first non-linear entangled seam and the second non-linear entangled seam each extend in a material flow direction.

Clause 61. The array of garments according to clause 60, wherein a distance between the first non-linear entangled seam and the second non-linear entangled seam varies along the material flow direction, wherein the distance between the first non-linear entangled seam and the second non-linear entangled seam is measured in a direction non-parallel to the material flow direction.

Clause 62. The array of garments according to any of clauses 59 through 61, wherein the first non-linear entangled seam and the second non-linear entangled seam include different visual arrangements of entangled seams.

Clause 63. The array of garments according to any of clauses 59 through 62, wherein the entanglement areas partially overlap each other.

Clause 64. The array of garments according to any of clauses 59 through 63, wherein the array of garments include upper-body garments.

Clause 65. The array of garments according to any of clauses 59 through 63, wherein the array of garments include lower-body garments.

Clause 66. An entanglement system for forming at least one non-linear entangled seam on a composite nonwoven textile, the entanglement system comprising: a first entanglement station comprising: a conveyance system having a surface adapted to advance the composite nonwoven textile in a material flow direction; a first actuator adapted to actuate a first entanglement head coupled to the first actuator; and a first carriage coupled to the first entanglement head, the first carriage adapted to move in a first direction non-parallel to the material flow direction.

Clause 67. The entanglement system according to clause 66, wherein the first actuator is adapted to actuate the first entanglement head to emit one or more jets of a fluid.

Clause 68. The entanglement system according to clause 66, wherein the first entanglement head includes an entanglement needle, and wherein the first actuator is adapted to move one or more of the first entanglement head and the entanglement needle in a direction perpendicular to a plane of conveyance of the surface.

Clause 69. The entanglement system according to any of clauses 66 through 68, wherein the first carriage is further adapted to move in a second direction non-parallel to the material flow direction, the second direction opposite the first direction.

Clause 70. The entanglement system according to clause 69, wherein the second direction is perpendicular to the material flow direction.

Clause 71. The entanglement system according to any of clauses 66 through 70, wherein the first entanglement head has a first dimension in the material flow direction.

Clause 72. The entanglement system according to clause 71, wherein the conveyance system is adapted to advance the composite nonwoven textile in the material flow direction, and wherein a distance of advancement of the conveyance system is less than the first dimension of the first entanglement head.

Clause 73. The entanglement system according to any of clauses 66 through 72, wherein the first carriage is indirectly coupled to the first entanglement head by way of the first actuator.

Clause 74. The entanglement system according to any of clauses 66 through 73, the first entanglement station further comprising a plurality of additional entanglement heads coupled to the first actuator.

Clause 75. The entanglement system according to clause 74, wherein the plurality of additional entanglement heads coupled to the first actuator are non-uniformly spaced apart from each other.

Clause 76. The entanglement system according to any of clauses 66 through 75, further comprising: a second entanglement station comprising: the conveyance system having the surface adapted to advance the composite nonwoven textile in the material flow direction; a second actuator adapted to actuate a second entanglement head coupled to the second actuator; and a second carriage coupled to the second entanglement head, the second carriage adapted to move in the first direction non-parallel to the material flow direction.

Clause 77. The entanglement system according to clause 76, wherein the first entanglement head is positioned a first distance inward from a first edge of the surface of the conveyance system and the second entanglement head is positioned a second distance inward from the first edge of the surface of the conveyance system, the second distance different from the first distance.

Clause 78. The entanglement system according to any of clauses 76 through 77, wherein the second entanglement station is positioned at a location subsequent to the first entanglement station in the material flow direction.

Clause 79. The entanglement system according to any of clauses 76 through 78, the second entanglement station further comprising a plurality of additional entanglement heads coupled to the second actuator.

Clause 80. The entanglement system according to clause 79, wherein a spacing arrangement between the plurality of additional entanglement heads coupled to the second actuator differs from a spacing arrangement between the plurality of additional entanglement heads coupled to the first actuator.

Clause 81. The entanglement system according to any of clauses 79 through 80, wherein a number of the plurality of additional entanglement heads coupled to the second actuator differs from a number of the plurality of additional entanglement heads coupled to the first actuator.

Clause 82. The entanglement system according to any of clauses 76 through 81, wherein a dimension of the second entanglement head is different from a dimension of the first entanglement head.

Clause 83. The entanglement system according to any of clauses 76 through 82, wherein an entanglement footprint produced by the second entanglement head is different from an entanglement pattern produced by the first entanglement head.

Clause 84. A method of manufacturing a nonwoven textile comprising: while the nonwoven textile is in a first position on an entanglement machine, causing an entanglement head to engage the nonwoven textile to form a first entanglement area on the nonwoven textile; advancing the nonwoven textile in a material flow direction through the entanglement machine; moving one or more of the entanglement head and the nonwoven textile in a first direction non-parallel to the material flow direction; and while the nonwoven textile is in a second position advanced from the first position in the material flow direction, causing the entanglement head to engage the nonwoven textile to form a second entanglement area on the nonwoven textile, the second entanglement area extending from the first entanglement area to form a non-linear entangled seam.

Clause 85. The method of manufacturing the nonwoven textile according to clause 84, wherein at each of the first entanglement area and the second entanglement area, fibers forming the nonwoven textile are caused to move from a generally horizontal orientation to a generally vertical orientation.

Clause 86. The method of manufacturing the nonwoven textile according to any of clauses 84 through 85, wherein the first entanglement area partially overlaps the second entanglement area.

Clause 87. The method of manufacturing the nonwoven textile according to clause 86, wherein a stitch density at the overlap area between the first entanglement area and the second entanglement area is greater than a stitch density at remaining portions of the first entanglement area and the second entanglement area.

Clause 88. The method of manufacturing the nonwoven textile according to any of clauses 84 through 87, wherein when the nonwoven textile is in the first position, the entanglement head moves in a direction perpendicular to a surface plane of the nonwoven textile.

Clause 89. The method of manufacturing the nonwoven textile according to any of clauses 84 through 88, further comprising: subsequent to forming the second entanglement area, advancing the nonwoven textile in the material flow direction; moving one or more of the entanglement head and the nonwoven textile in a second direction non-parallel to the material flow direction, the second direction opposite the first direction; and while the nonwoven textile is in a third position advanced from the second position in the material flow direction, causing the entanglement head to engage the nonwoven textile to form a third entanglement area on the nonwoven textile, the third entanglement area extending from the second entanglement area to form the non-linear entangled seam.

Clause 90. The method of manufacturing the nonwoven textile according to clause 89, wherein the third entanglement area partially overlaps the second entanglement area.

Clause 91. A garment comprising: a nonwoven textile having a material flow direction; and at least one non-linear entangled seam extending along the material flow direction, the at least one non-linear entangled seam comprising one or more entanglement areas extending from each other to form the at least one non-linear entangled seam, wherein at each of the one or more entanglement areas, fibers forming the nonwoven textile have a generally vertical orientation.

Clause 92. The garment according to clause 91, wherein the one or more entanglement areas comprise discrete areas.

Clause 93. The garment according to clause 91, wherein the one or more entanglement areas partially overlap each other.

Clause 94. The garment according to any of clauses 91 through 93, further comprising a plurality of additional non-linear entangled seams, wherein the plurality of additional non-linear entangled seams forms a non-repeating visual arrangement of entangled seams.

Clause 95. The garment according to any of clauses 91 through 94, further comprising one or more additional layers secured to the nonwoven textile by one or more of entanglement, stitching, bonding, and adhesives.

Clause 96. The garment according to clause 95, wherein the one or more additional layers comprise one or more of a structured textile, a nonwoven layer, a film, and a fill material.

Clause 97. A nonwoven textile having a material flow direction, the nonwoven textile comprising: at least one non-linear entangled seam extending along the material flow direction, the at least one non-linear entangled seam comprising one or more entanglement areas extending from each other to form the at least one non-linear entangled seam, wherein at each of the one or more entanglement areas, fibers forming the nonwoven textile have a generally vertical orientation.

Clause 98. The nonwoven textile according to clause 97, wherein the one or more entanglement areas comprise discrete entanglement areas.

Clause 99. The nonwoven textile according to clause 97, wherein the one or more entanglement areas partially overlap each other.

Clause 100. The nonwoven textile according to any of clauses 97 through 99, further comprising a plurality of additional non-linear entangled seams, wherein the plurality of additional non-linear entangled seams forms a non-repeating visual arrangement of entangled seams.

Clause 101. An array of garments having a common finished form, the array of garments formed from a nonwoven textile having at least a first non-linear entangled seam and a second non-linear entangled seam, the first non-linear entangled seam and the second non-linear entangled seam each comprising entanglement areas extending from each other to form the respective first non-linear entangled seam and the second non-linear entangled seam, wherein the entanglement areas comprise fibers from the nonwoven layer wherein having a generally vertical orientation, the array of garments comprising: a first garment formed from a first instance of a pattern piece taken from the nonwoven textile, the first non-linear entangled seam and the second non-linear entangled seam positioned at a first location on the first garment; and a second garment formed from a second instance of the pattern piece taken from the nonwoven textile, the first non-linear entangled seam and the second non-linear entangled seam positioned at a second location on the second garment, the second location different from the first location relative to the pattern piece.

Clause 102. The array of garments according to clause 101, wherein the first non-linear entangled seam and the second non-linear entangled seam each extend in a material flow direction.

Clause 103. The array of garments according to any of clauses 101 through 102, wherein the entanglement areas partially overlap each other.

Clause 104. The array of garments according to any of clauses 101 through 103, further comprising a third garment formed from a third instance of the pattern piece taken from the nonwoven textile, the first non-linear entangled seam and the second non-linear entangled seam positioned at a third location on the third garment, the third location different from one or more of the first location and the second location relative to the pattern piece.

Clause 105. The array of garments according to any of clauses 101 through 104, wherein the array of garments includes upper-body garments.

Clause 106. The array of garments according to any of clauses 101 through 104, wherein the array of garments includes lower-body garments.

Clause 107. A method of manufacturing an array of garments having a common finished form, the method comprising: obtaining a nonwoven textile having at least a first non-linear entangled seam and a second non-linear entangled seam, the first non-linear entangled seam and the second non-linear entangled seam each comprising entanglement areas extending from each other to form an apparent continuous non-linear entangled seam, wherein the entanglement areas comprise fibers having a generally vertical orientation; removing a first portion having a first pattern from the nonwoven textile, the first portion having the first non-linear entangled seam and the second non-linear entangled seam; using the first portion to form a first garment, the first non-linear entangled seam and the second non-linear entangled seam positioned at a first location on the first portion; removing a second portion having the first pattern from the nonwoven textile, the second portion having the first non-linear entangled seam and the second non-linear entangled seam; and using the second portion to form a second garment, the first non-linear entangled seam and the second non-linear entangled seam positioned at a second location on the second portion, the second location different from the first location.

Clause 108. The method of manufacturing the array of garments according to clause 107, wherein the first non-linear entangled seam and the second non-linear entangled seam each extend in a material flow direction.

Clause 109. The method of manufacturing the array of garments according to clause 108, wherein a distance between the first non-linear entangled seam and the second non-linear entangled seam varies along the material flow direction, wherein the distance between the first non-linear entangled seam and the second non-linear entangled seam is measured in a direction non-parallel to the material flow direction.

Clause 110. The method of manufacturing the array of garments according to any of clauses 107 through 109, wherein the first non-linear entangled seam and the second non-linear entangled seam include different visual arrangements of entangled seams.

Clause 111. The method of manufacturing the array of garments according to any of clauses 107 through 110, wherein the entanglement areas partially overlap each other.

Clause 112. The method of manufacturing the array of garments according to any of clauses 107 through 111, wherein the array of garments include upper-body garments.

Clause 113. The method of manufacturing the array of garments according to any of clauses 107 through 111, wherein the array of garments include lower-body garments.

Clause 114. An array of garments having a common finished form, the array of garments formed from a nonwoven textile having at least a first non-linear entangled seam and a second non-linear entangled seam, the first non-linear entangled seam and the second non-linear entangled seam each comprising entanglement areas extending from each other to form the respective first non-linear entangled seam and the second non-linear entangled seam, wherein at each of the entanglement areas, fibers forming the nonwoven textile have a generally vertical orientation, the array of garments comprising: a first garment formed from a first portion of the nonwoven textile having a first pattern, the first non-linear entangled seam and the second non-linear entangled seam positioned at a first location on the first portion of the first garment; and a second garment formed from a second portion of the nonwoven textile having the first pattern, the first non-linear entangled seam and the second non-linear entangled seam positioned at a second location on the second portion of the second garment, the second location different from the first location.

Clause 115. The array of garments according to clause 114, wherein the first non-linear entangled seam and the second non-linear entangled seam each extend in a material flow direction.

Clause 116. The array of garments according to clause 115, wherein a distance between the first non-linear entangled seam and the second non-linear entangled seam varies along the material flow direction, wherein the distance between the first non-linear entangled seam and the second non-linear entangled seam is measured in a direction non-parallel to the material flow direction.

Clause 117. The array of garments according to any of clauses 114 through 116, wherein the first non-linear entangled seam and the second non-linear entangled seam include different visual arrangements of entangled seams.

Clause 118. The array of garments according to any of clauses 114 through 117, wherein the entanglement areas partially overlap each other.

Clause 119. The array of garments according to any of clauses 114 through 118, wherein the array of garments include upper-body garments.

Clause 120. The array of garments according to any of clauses 114 through 118, wherein the array of garments include lower-body garments.

Aspects of the present disclosure have been described with the intent to be illustrative rather than restrictive. Alternative aspects will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

What is claimed is:

1. An entanglement system for forming at least one entangled seam on a composite nonwoven textile having a first width, the entanglement system comprising:
   a first entanglement station comprising:
   a conveyance system having a surface adapted to advance the composite nonwoven textile in a material flow direction perpendicular to the first width;
   a first actuator adapted to actuate a first entanglement head coupled to the first actuator; and
   a first carriage coupled to the first entanglement head, the first carriage adapted to move in a first direction non-parallel to the material flow direction;
   wherein a first entanglement footprint produced by the first entanglement head in the composite nonwoven textile has a second width in the first direction that is less than the first width.

2. The entanglement system of claim 1, wherein the first actuator is adapted to actuate the first entanglement head to emit one or more jets of a fluid.

3. The entanglement system of claim 1, wherein the first entanglement head includes an entanglement needle, and wherein the first actuator is adapted to move one or more of the first entanglement head and the entanglement needle in a direction perpendicular to a plane of conveyance of the surface.

4. The entanglement system of claim 1, wherein the first carriage is further adapted to move in a second direction non-parallel to the material flow direction, the second direction opposite the first direction.

5. The entanglement system of claim 4, wherein the second direction is perpendicular to the material flow direction.

6. The entanglement system of claim 1, wherein the first entanglement head has a first dimension in the material flow direction.

7. The entanglement system of claim 6, wherein the conveyance system is adapted to advance the composite nonwoven textile in the material flow direction, and wherein a distance of advancement of the conveyance system is less than the first dimension of the first entanglement head.

8. The entanglement system of claim 1, the first entanglement station further comprising a plurality of additional entanglement heads coupled to the first actuator.

9. The entanglement system of claim 1, further comprising:
   a second entanglement station comprising:
   the conveyance system having the surface adapted to advance the composite nonwoven textile in the material flow direction;
   a second actuator adapted to actuate a second entanglement head coupled to the second actuator; and
   a second carriage coupled to the second entanglement head, the second carriage adapted to move independently from the first entanglement head in the first direction non-parallel to the material flow direction;
   wherein:
   in a first configuration, the second entanglement head is positioned closer to a side edge of the surface of the conveyance system than the first entanglement head in the first direction, and
   in a second configuration, the second entanglement head is positioned further from the side edge than the first entanglement head in the first direction.

10. The entanglement system of claim 9, wherein the second entanglement station is positioned at a location subsequent to the first entanglement station in the material flow direction.

11. The entanglement system of claim 9, wherein a second entanglement footprint produced by the second entanglement head is different from the first entanglement footprint.

* * * * *